(12) United States Patent
Sharma et al.

(10) Patent No.: US 7,194,337 B2
(45) Date of Patent: Mar. 20, 2007

(54) AGENT-BASED OPERATION OF A ROBOTIC DEVICE

(75) Inventors: Ratnesh K. Sharma, Union City, CA (US); Cullen E. Bash, San Francisco, CA (US); Chandrakant D. Patel, Fremont, CA (US)

(73) Assignee: Hewlett-Packard Development Company, LP, Houston, TX (US)

( * ) Notice: Subject to any disclaimer, the term of this patent is extended or adjusted under 35 U.S.C. 154(b) by 494 days.

(21) Appl. No.: 10/697,692

(22) Filed: Oct. 31, 2003

(65) Prior Publication Data

US 2005/0096789 A1  May 5, 2005

(51) Int. Cl.
G01M 1/38 (2006.01)

(52) U.S. Cl. ............... 700/276; 700/193; 700/299; 700/300; 700/245; 156/200; 156/201; 156/287; 62/84; 62/129

(58) Field of Classification Search ........... 700/276, 700/299, 300, 245; 165/200, 201, 287; 62/84, 62/129
See application file for complete search history.

(56) References Cited

U.S. PATENT DOCUMENTS 5,949,683 A * 9/1999 Akami et al. ............ 700/123
5,963,458 A * 10/1999 Cascia ..................... 700/300
6,208,612 B1 * 3/2001 Miller ..................... 369/30.19
6,408,225 B1 * 6/2002 Ortmeier et al. ........... 700/254
6,522,954 B1 * 2/2003 Kummerer et al. ........ 700/278
6,647,318 B2 * 11/2003 Salsbury ................... 700/276
2005/0187664 A1 * 8/2005 Bash et al. ................ 700/276

* cited by examiner

*Primary Examiner*—Thomas G. Black
*Assistant Examiner*—McDieunel Marc
(74) *Attorney, Agent, or Firm*—Richard P. Lange

(57) ABSTRACT

A method for agent-based operation of a robotic device. In the method, at least one condition is detected in various locations of a room with a plurality of sensors. In a plurality of agents associated with respective areas of the room, the plurality of agents being configured to control at least one condition in the respective associated areas, sensed data is received from at least one of the plurality of sensors. In addition, it is determined whether the received sensed data are outside of respective predetermined ranges, and information related to the sensed data in response to the sensed data being outside of the predetermined ranges is transmitted to the robotic device. In the robotic device, the information received from one or more of the plurality of agents is processed to determine whether components of a cooling system are to be manipulated to vary a characteristic of cooling fluid supplied to the various locations of the room.

50 Claims, 7 Drawing Sheets

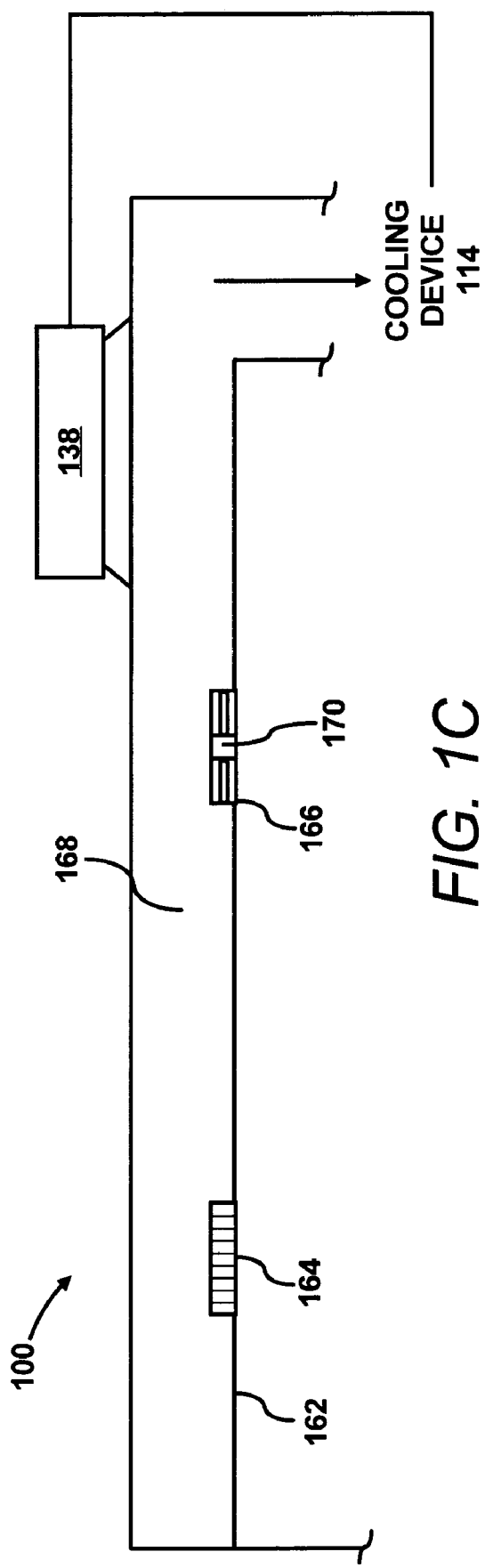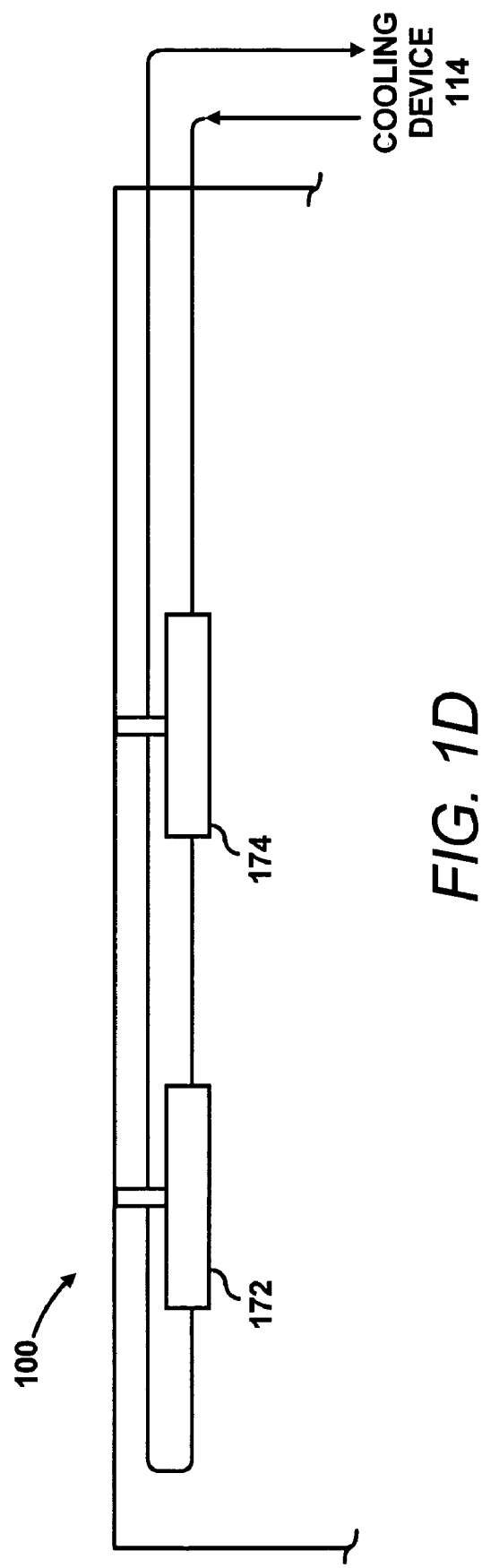

AGENT-BASED OPERATION OF A ROBOTIC DEVICE

BACKGROUND OF THE INVENTION

A data center may be defined as a location, e.g., room, that houses computer systems arranged in a number of racks. A standard rack, e.g., electronics cabinet, is defined as an Electronics Industry Association (EIA) enclosure, 78 in. (2 meters) high, 24 in. (0.61 meter) wide and 30 in. (0.76 meter) deep. These racks are configured to house a number of computer systems, e.g., about forty (40) systems, with future configurations of racks being designed to accommodate up to eighty (80) systems. The computer systems typically include a number of components, e.g., one or more of printed circuit boards (PCBs), mass storage devices, power supplies, processors, micro-controllers, semi-conductor devices, and the like, that may dissipate relatively significant amounts of heat during the operation of the respective components. For example, a typical computer system comprising multiple microprocessors may dissipate approximately 250 W of power. Thus, a rack containing forty (40) computer systems of this type may dissipate approximately 10 KW of power.

The power required to transfer the heat dissipated by the components in the racks to the cool air contained in the data center is generally equal to about 10 percent of the power needed to operate the components. However, the power required to remove the heat dissipated by a plurality of racks in a data center is generally equal to about 50 percent of the power needed to operate the components in the racks. The disparity in the amount of power required to dissipate the various heat loads between racks and data centers stems from, for example, the additional thermodynamic work needed in the data center to cool the air. In one respect, racks are typically cooled with fans that operate to move cooling fluid, e.g., air, cooling fluid, etc., across the heat dissipating components; whereas, data centers often implement reverse power cycles to cool heated return air. The additional work required to achieve the temperature reduction, in addition to the work associated with moving the cooling fluid in the data center and the condenser, often add up to the 50 per cent power requirement. As such, the cooling of data centers presents problems in addition to those faced with the cooling of the racks.

Conventional data centers are typically cooled by operation of one or more air conditioning units. For example, compressors of air conditioning units typically consume a minimum of about thirty (30) percent of the required operating energy to sufficiently cool the data centers. The other components, e.g., condensers, air movers (fans), etc., typically consume an additional twenty (20) percent of the required total operating energy. As an example, a high density data center with 100 racks, each rack having a maximum power dissipation of 10 KW, generally requires 1 MW of cooling capacity. Air conditioning units with a capacity of 1 MW of heat removal generally requires a minimum of 300 KW input compressor power in addition to the power needed to drive the air moving devices, e.g., fans, blowers, etc. Conventional data center air conditioning units do not vary their cooling fluid output based on the distributed needs of the data center. Instead, these air conditioning units generally operate at or near a maximum compressor power even when the heat load is reduced inside the data center.

The substantially continuous operation of the air conditioning units is generally designed to operate according to a worst-case scenario. For example, air conditioning systems are typically designed around the maximum capacity and redundancies are utilized so that the data center may remain on-line on a substantially continual basis. However, the computer systems in the data center may only utilize around 30–50% of the maximum cooling capacity. In this respect, conventional cooling systems often attempt to cool components that may not be operating at a level which may cause their temperatures to exceed a predetermined temperature range. Consequently, conventional cooling systems often incur greater amounts of operating expenses than may be necessary to sufficiently cool the heat generating components contained in the racks of data centers.

Another problem associated with the cooling of data centers involves the expense and difficulty in measuring the environmental conditions, e.g., temperature, humidity, air flow, etc., within and around the racks. Although it has been found that the use of temperature sensors, e.g., thermocouples, located at various locations throughout the data center has been a relatively accurate manner of detecting temperatures, this practice has also been found to be relatively restrictive due to the difficulty and costs associated with this implementation. By way of example, a large number of sensors typically must be implemented to adequately detect the environmental conditions throughout the data center.

In addition, when the racks or components of a data center are added or re-arranged, the locations of the sensors must also be moved or recalibrated. Since most conventional sensors are wired to a power source and to a network for transmitting information, the movement of the sensors may prove to be a relatively difficult task requiring a great deal of time and manual input.

One solution to reducing costs associated with deploying and maintaining a sensor network has been to substantially reduce the total number of sensors employed in the data center. In this regard, the sensors are positioned at relatively distant locations with respect to each other. One problem associated with reducing the number of sensors is that there may be areas in which the sensors are unable to obtain sensed data. For instance, it may be difficult or impossible for the sensors to obtain sensed data at locations substantially centrally located between sensors. Another problem with reducing the number of sensors is that it may be impossible to determine problem areas, e.g., hot spots, malfunctioning vents, etc., as these problem areas may not be within range of the sensors. In addition, even if one or more of the sensors were able to detect a condition, e.g., air flow temperature, from a problem area, the air flow temperature may have varied from the time the air flowed from the problem area to the sensor. Therefore, it may be difficult to obtain environmental condition information with substantial accuracy and coverage.

SUMMARY OF THE INVENTION

According to an embodiment, the present invention pertains to a method for agent-based operation of a robotic device. In the method, at least one condition is detected in various locations of a room with a plurality of sensors. In a plurality of agents associated with respective areas of the room, the plurality of agents being configured to control at least one condition in the respective associated areas, sensed data is received from at least one of the plurality of sensors. In addition, it is determined whether the received sensed data are outside of respective predetermined ranges, and information related to the sensed data in response to the sensed data being outside of the predetermined ranges is transmitted to the robotic device. In the robotic device, the information received from one or more of the plurality of agents is processed to determine whether components of a cooling system are to be manipulated to vary a characteristic of cooling fluid supplied to the various locations of the room.

BRIEF DESCRIPTION OF THE DRAWINGS

Features of the present invention will become apparent to those skilled in the art from the following description with reference to the figures, in which:

FIG. 1C is a cross-sectional side view of an upper portion of the data center shown in FIGS. 1A and 1B according to an embodiment of the invention;

FIG. 1D is a cross-sectional side view of an upper portion of the data center shown in FIGS. 1A and 1B according to a further embodiment of the invention;

DETAILED DESCRIPTION OF THE INVENTION

Figure 1A:
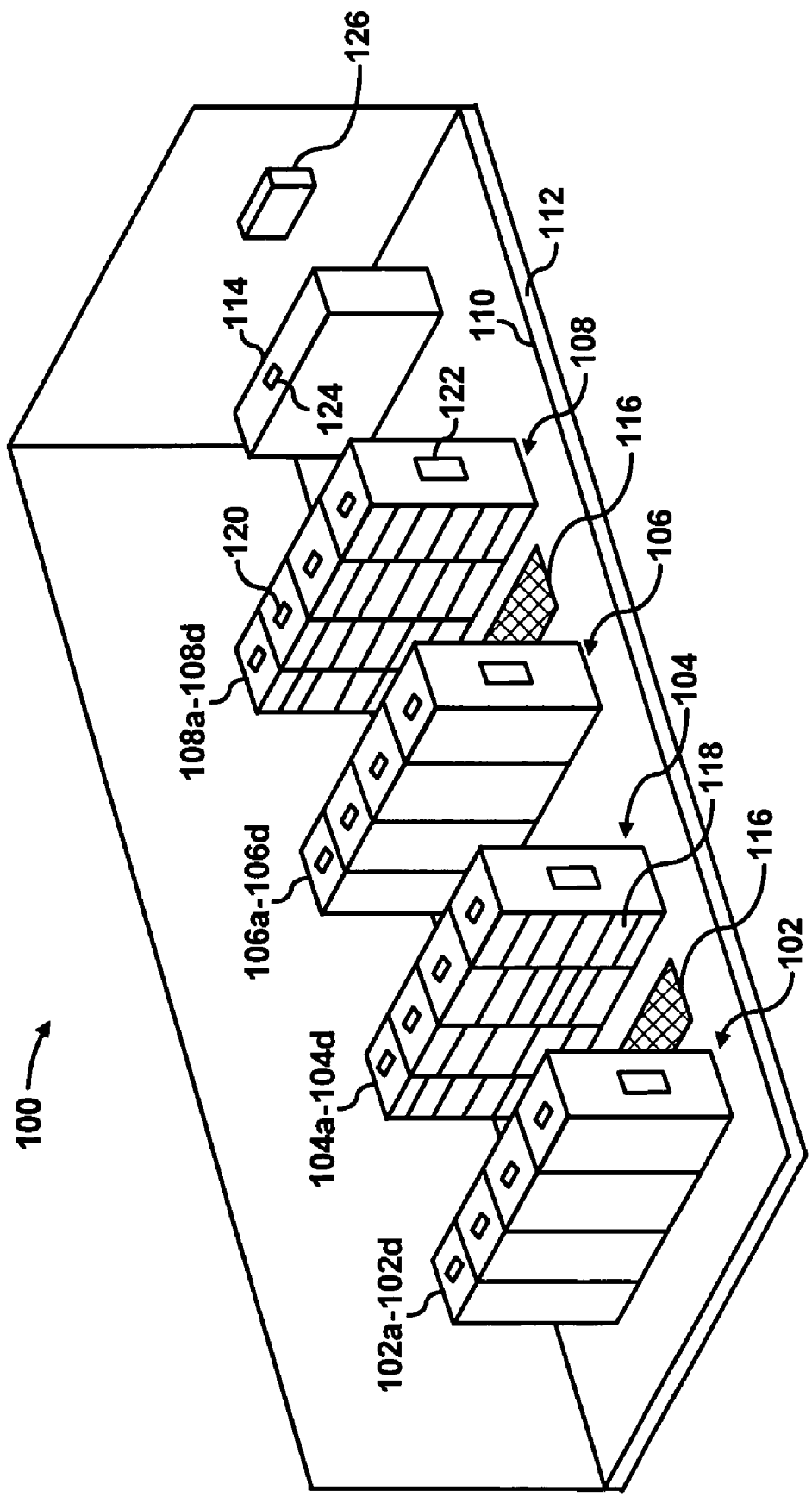
FIG. 1A shows a simplified perspective view of a room, e.g., a data center, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Throughout the present disclosure, reference is made to "cooling fluid" and "heated cooling fluid". For purposes of simplicity, "cooling fluid" may generally be defined as air that has been cooled by a cooling device, e.g., an air conditioning unit. In addition, "heated cooling fluid" may generally be defined as cooling fluid that has been heated. It should be readily apparent, however, that the terms "cooling fluid" are not intended to denote air that only contains cooled fluid and that "heated cooling fluid" only contains cooling fluid that has been heated. Instead, embodiments of the invention may operate with air that contains a mixture of heated cooling fluid and cooling fluid. In addition, cooling fluid and heated cooling fluid may denote gases other than air, e.g., refrigerant and other types of gases known to those of ordinary skill in the art that may be used to cool electronic components.

According to embodiments of the invention, a robotic device operates as an agent to distribute cooling resources in a data center, e.g., a room that houses a number of printed circuit (PC) board electronic systems arranged in a number of racks. The data center includes rack agents, row agents, and computer room air conditioning (hereinafter "CRAC") agents. The agents may be defined as elements or entities of the data center that perceive their environment through sensors and act upon that environment through effectors either in a collaborative or autonomous manner to achieve pre-defined goals. The rack agents, row agents, and CRAC agents have predefined goals or objectives, e.g., predetermined temperature ranges, predetermined energy usages, etc., and are configured to request cooling resources to achieve those goals. The robotic device receives these requests and determines the distribution of the cooling resources according to, for instance, the hierarchy of the agents and their bids. The robotic device may also detect one or more environmental conditions at locations associated with the agents and apply its own sensed data to determine which requests to accept and which requests to deny.

According to other embodiments of the invention, the requests for additional cooling resources are considered buy bids and requests for a decrease in cooling resources are considered sell offers. The acceptance and denial of buy bids and sell offers may be predicated upon market-based considerations and the robotic device may operate as an auctioneer. The buy bids and sell offers from the rack, row, and CRAC agents may be submitted to the robotic device. The robotic device may establish a price for the thermal resources and also establish the wealth of particular agents. In this regard, the robotic device may allocate cooling resources, e.g., accept or reject bids and offers, based upon the amounts of the buy bids and sell offers.

According to another embodiment of the invention, the robotic device operates as a controller for supervising cooling resource distribution in the data center. In one respect, as the robotic device traverses the data center, the robotic device may receive requests from one or more agents to manipulate one or more cooling system components to thereby alter an environmental condition in areas associated with the one or more agents. The robotic device may process the requests and may vary either inform the agents to proceed with manipulation of the one or more cooling system components or the robotic device may control the one or more cooling system components to become manipulated in manners requested by the agents. For instance, the robotic device may instruct a vent controller to increase the cooling fluid flow therethrough in response to receipt of a request to manipulate the vent controller made by an agent. As another example, the robotic device may itself control the vent tile to increase the cooling fluid flow therethrough. In this regard, the robotic device may function as a controller for the cooling system components.

Through implementation of the robotic device as described hereinabove, distributed agents may be employed to direct distribution of cooling provisions to reduce power consumption and to increase cooling efficiency. In addition, the distributed agents may better monitor conditions in the data center by processing information in parallel at different locations in the data center. Individual thresholds and routines may be associated with the distributed agents to enable limited autonomy when controlling operations of the cooling system. The distributed agents may also be configured to request assistance from the robotic device to meet their predefined goals. In another respect, a robotic device is configured to traverse the data center and to make cooling resource control decisions based upon information received from the agents and the robotic device's objectives. In a further respect, the robotic device may obtain its own measurements at various locations in the data center and may substantially base its control decisions on those measurements.

With reference first to FIG. 1A, there is shown a simplified perspective view of a room, e.g., a data center 100, according to an embodiment of the invention. The terms "data center" are generally meant to denote a room or other space and are not meant to limit the invention to any specific type of room where data is communicated or processed, nor should it be construed that use of the terms "data center" limits the invention in any respect other than its definition hereinabove.

The data center 100 depicted in FIG. 1A represents a generalized illustration and other components may be added or existing components may be removed or modified without departing from the scope of the invention. For example, the data center 100 may include any number of racks and various other apparatuses known to be housed in data centers. Thus, although the data center 100 is illustrated as containing four rows of racks 102–108, it should be understood that the data center 100 may include any number of racks, e.g., 100 racks, without departing from the scope of the invention. The depiction of four rows of racks 102–108 is thus for illustrative and simplicity of description purposes only and is not intended to limit the invention in any respect.

The data center 100 is depicted as having a plurality of racks 102–108, e.g., electronics cabinets, aligned in substantially parallel rows. The racks 102–108 are illustrated as having open front sides such that the components 118 housed therein are visible. It should, however, be understood that embodiments of the invention may be practiced with racks having panels that cover the front sides of the racks 102–108 without departing from the scope of the invention. The rows of racks 102–108 are shown as containing four racks (a–d) positioned on a raised floor 110. A plurality of wires and communication lines (not shown) may be located in a space 112 beneath the raised floor 110. The space 112 may also function as a plenum for delivery of cooling fluid from a computer room air conditioner (CRAC) 114 to the racks 102–108. The cooling fluid may be delivered from the space 112 to the racks 102–108 through vent tiles 116 located between some or all of the racks 102–108. The vent tiles 116 are shown in FIG. 1A as being located between racks 102 and 104 and 106 and 108.

The racks 102–108 are generally configured to house a plurality of components 118, e.g., computers, servers, monitors, hard drives, disk drives, etc., designed to perform various operations, e.g., computing, switching, routing, displaying, etc. These components 118 may comprise subsystems (not shown), for example, processors, micro-controllers, high-speed video cards, memories, semi-conductor devices, and the like to perform these functions. In the performance of these electronic functions, the components 118, and therefore the subsystems, generally dissipate relatively large amounts of heat. Because the racks 102–108 have generally been known to include upwards of forty (40) or more subsystems, they may transfer substantially large amounts of heat to the cooling fluid to maintain the subsystems and the components generally within predetermined operating temperature ranges.

A relatively small number of components 118 are illustrated as being housed in the racks 102–108 for purposes of simplicity. It should, however, be understood that the racks 102–108 may include any number of components 118, e.g., forty or more components 118, without departing from the scope of the invention. In addition, although the racks 102–108 are illustrated as containing components 118 throughout the heights of the racks 102–108, it should be understood that some or all of the racks 102–108 may include slots or areas that do not include components 118 without departing from the scope of the invention.

According to an embodiment of the invention, agents 120–124 are distributed throughout the data center 100. The agents 120–124 illustrated in FIG. 1A are for illustrative purposes only and are not meant to limit the invention in any respect. Instead, the agents 120–124 may be positioned at any reasonably suitable location around the data center 100. The agents 120–124 may comprise algorithms or software stored in one or more locations of the data center 100 and may thus not comprise separate physical structures as illustrated in FIG. 1A. For instance, the agents 120–124 may be stored in the memories of various components housed in the racks 102–108 and distributed throughout the data center 100. In addition or alternatively, the agents 120–124 may be stored and executed by a computer system 126 generally configured to control operations of the cooling system, e.g., CRAC 114, vent tiles 116, etc.

The agents 120–124 may operate as substantially autonomous devices designed to realize various goals or to perform various tasks. These goals may comprise maintaining environmental conditions within their respective areas within predefined ranges, operating cooling system components at predefined energy efficiency levels, etc. In trying to obtain these goals, the agents 120–124 may be designed to communicate with a robotic device for assistance. The robotic device may have its own goals or objectives and may determine how to manipulate the agents' 120–124 goals while maintaining its own goals or objectives.

Generally speaking, the computer system 126 may be configured to vary cooling provisions based upon various environmental conditions in the data center 100. By way of example, the computer system 126 may be configured to vary the flow of cooling fluid through the vent tiles 116 and the computer system 126 may vary the output, e.g., temperature and/or volume of cooling fluid, of the CRAC 114.

The agents 120–124 may be configured to receive sensed data from sensors (not shown) located at various locations throughout the data center 100. The sensors may be positioned to detect one or more environmental conditions, e.g., temperature, pressure, humidity, air flow, etc., in various areas of the data center 100, e.g., around the racks 102–108, around the vent tiles 116, cooling fluid flow into and out of the CRAC 114, etc. In addition, the sensors may comprise sensors of the components 118 housed in the racks 102–108, e.g., sensors integrally formed with one or more of the components 118. In the event that the agents 120–124 are stored in the computer system 126, the detected sensed data may be transmitted to the computer system 126. The communication between the sensors 120 and the computer system 126 may be effectuated through a wired protocol, such as IEEE 802.3, etc., or wireless protocols, such as IEEE 801.11b, 801.11g, wireless serial connection, Bluetooth, etc., or combinations thereof. The agents 120–124 may employ the received sensed data to determine, for instance, whether changes in cooling fluid supply and/or removal is warranted in particular areas of the data center 100, as will be described in greater detail hereinbelow.

In addition, or alternatively, communications between the sensors and the computer system 126 and/or agents 120–124 may be effectuated through location aware devices as described in co-pending and commonly assigned U.S. patent application Ser. No. 10/620,272, filed on Jul. 9, 2003, entitled "LOCATION AWARE DEVICES", the disclosure of which is hereby incorporated by reference in its entirety. As described in that application, these devices are termed "location aware" because they are operable to determine their general locations with respect to other sensors and/or devices and to communicate with one another through wireless communications.

An embodiment of the agents 120–124 is described in commonly assigned and co-pending U.S. patent application Ser. No. 10/345,723, filed on Jan. 16, 2003, entitled "AGENT BASED CONTROL METHOD AND SYSTEM FOR ENERGY MANAGEMENT", the disclosure of which is hereby incorporated by reference in its entirety. In addition, the agents 120–124 and their functionalities are described in greater detail hereinbelow.

According to an embodiment of the present invention, rack agents 120 may be assigned to receive sensed data concerning one or more racks. For instance, in FIG. 1A, the rack agent labeled as 120 may be configured to receive sensed data concerning rack 108c. In addition, row agents 122 may be assigned to receive sensed data concerning one or more rows of racks. By way of example, the row agent labeled as 122 may be configured to receive sensed data concerning the row of racks 108a–108d. Sensors positioned to detect conditions in the racks 108a–108d may communicate the detected sensed data to rack agents 120 as well as to the row agents 122. In addition or alternatively, the row agents 122 may receive sensed data from the rack agents 120 positioned to receive sensed data concerning racks located in their associated rows.

Although FIG. 1A has been illustrated and described as comprising a 1:1 correspondence between the racks and rack agents, between the rows and row agents, and between the CRACs and CRAC agents, it should be that other configurations are possible without deviating from the scope of the invention. For instance, a rack agent 120 may receive sensed data from sensors configured to detect the one or more environmental conditions with respect to a plurality of racks. In this regard, a single rack agent 120 may be assigned to the plurality of racks. In addition, a single row agent 122 may be assigned to a plurality rows and a single CRAC agent 124 may be assigned to a plurality of CRACS. Thus, it should be understood that the configurations of the agents 120–124 illustrated and described with respect to FIG. 1A are for purposes of simplicity of description and are not intended to limit the invention in any respect.

Figure 1B:
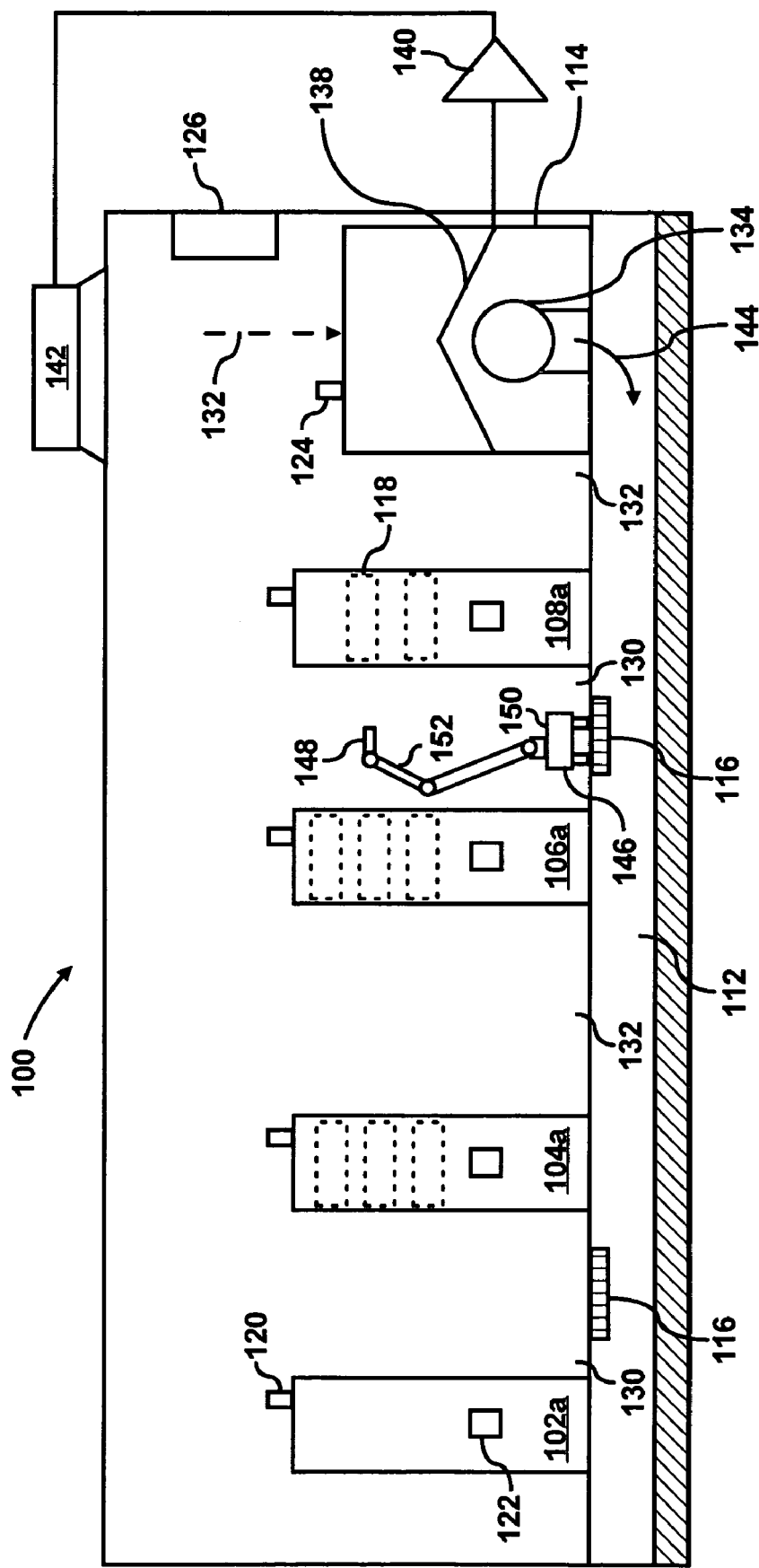
FIG. 1B shows a simplified illustration of a side elevational view of the data center shown in FIG. 1A, according to an embodiment of the invention.

With reference now to FIG. 1B, there is shown a simplified illustration of a side elevational view of the data center 100 shown in FIG. 1A, according to an embodiment of the invention. In FIG. 1B, racks 102a, 104a, 106a, and 108a are visible. In addition, some of the components 118 are visible in cross-section through the sides of the racks 102a, 104a, 106a, and 108a. A more detailed description of the elements illustrated with respect to FIG. 1B may be found in commonly assigned U.S. Pat. No. 6,574,104, filed on Oct. 5, 2001, which is hereby incorporated by reference in its entirety.

As shown in FIG. 1B, the areas between the racks 102 and 104 and between the racks 106 and 108 may comprise cool aisles 130. These aisles are considered "cool aisles" because they are configured to receive cooling fluid from the vent tiles 116. In addition, the racks 102–108 generally receive cooling fluid from the cool aisles 130. The aisles between the racks 104 and 106, and on the rear sides of racks 102 and 108, are considered hot aisles 132. These aisles are considered "hot aisles" because they are positioned to receive air heated by the components 118 in the racks 102–108.

The sides of the racks 102–108 that face the cool aisles 130 may be considered as the fronts of the racks 102–108 and the sides of the racks 102–108 that face away from the cool aisles 130 may be considered as the rears of the racks 102–108. For purposes of simplicity and not of limitation, this nomenclature will be relied upon throughout the present disclosure to describe the various sides of the racks 102–108.

As described hereinabove, the CRAC 114 receives and cools heated cooling fluid. In addition, the CRAC 114 supplies the racks 102–108 with chilled or cooled cooling fluid, through, for example, a process as described below. The CRAC 114 generally includes a fan 134 for supplying cooling fluid (e.g., air) into the space 112 (e.g., plenum) and/or drawing air from the data center 100. In operation, the heated cooling fluid enters into the CRAC 114 as indicated by the arrow 136 and is cooled by operation of a cooling coil 138, a compressor 140, and a condenser 142, in a manner generally known to those of ordinary skill in the art. In terms of cooling system efficiency, it is generally desirable that the return air is composed of the relatively warmest portion of air in the data center 100.

Although reference is made throughout the present disclosure of the use of a fan 134 to draw heated cooling fluid from the data center 100, it should be understood that any other reasonably suitable manner of air removal may be implemented without departing from the scope of the invention. By way of example, a fan or a blower (not shown) separate from the fan 134 may be utilized to draw heated cooling fluid from the data center 100.

In addition, based upon the cooling fluid needed to cool the heat loads in the racks 102–108, the CRAC 114 may be operated at various levels. For example, the capacity (e.g., the rate of work done by the compressor) of the compressor 140 and/or the speed of the fan 134 may be modified to thereby control the temperature and the amount of cooling fluid flow delivered to the racks 102–108. In this respect, the compressor 140 may comprise a variable capacity compressor and the fan 134 may comprise a variable speed fan. The compressor 140 may thus be controlled to either increase or decrease the mass flow rate of a refrigerant therethrough.

Because the specific type of compressor 140 and fan 134 to be employed with embodiments of the invention may vary according to individual needs, the invention is not limited to any specific type of compressor or fan. Instead, any reasonably suitable type of compressor 140 and fan 134 capable of accomplishing certain aspects of the invention may be employed with embodiments of the invention. The choice of compressor 140 and fan 134 may depend upon a plurality of factors, e.g., cooling requirements, costs, operating expenses, etc.

Embodiments of the invention may be operated with constant speed compressors and/or constant speed fans. In one respect, control of cooling fluid delivery to the racks 102–108 maybe based upon the pressure of the cooling fluid in the space 112. According to this embodiment, the pressure within the space 112 may be controlled through operation of, for example, a plurality of vent tiles 116 positioned at various locations in the data center 100. That is, the pressure within the space 112 may be kept essentially constant throughout the space 112 by selectively controlling the output of cooling fluid through the vent tiles 116. As an example, the space 112 may include a divider as shown and described in the U.S. Pat. No. 6,574,104 to substantially minimize turbulent cooling fluid flow through the space 112.

As another example, if the pressure of the cooling fluid in one location of the space 112 exceeds a predetermined level, a vent located substantially near that location may be caused to enable greater cooling fluid flow therethrough to thereby decrease the pressure in that location. A more detailed description of this embodiment may be found in U.S. application Ser. No. 10/303,761, filed on Nov. 26, 2002 and U.S. application Ser. No. 10/351,427, filed on Jan. 27, 2003, which are assigned to the assignee of the present invention and are hereby incorporated by reference in their entireties.

In addition, or as an alternative to the compressor 140, a heat exchanger (not shown) may be implemented in the CRAC 114 to cool the cooling fluid supply. The heat exchanger may comprise a chilled water heat exchanger, a centrifugal chiller (e.g., a chiller manufactured by YORK), and the like, that generally operates to cool air as it passes over the heat exchanger. The heat exchanger may comprise a plurality of air conditioners. The air conditioners may be supplied with water driven by a pump and cooled by a condenser or a cooling tower. The heat exchanger capacity may be varied based upon heat dissipation demands. Thus, the heat exchanger capacity may be decreased where, for example, it is unnecessary to maintain the cooling fluid at a relatively low temperature.

In operation, cooling fluid generally flows from the fan 134 into the space 112 as indicated by the arrow 144. The cooling fluid flows out of the raised floor 110 and into various areas of the racks 102–108 through the plurality of vent tiles 116. The vent tiles 116 may comprise the dynamically controllable vents disclosed and described in U.S. Pat. No. 6,574,104. As described in that application, the vent tiles 116 are termed "dynamically controllable" because they generally operate to control at least one of velocity, volume flow rate and direction of the cooling fluid therethrough. In addition, specific examples of dynamically controllable vent tiles 116 may be found in co-pending U.S. application Ser. No. 10/375,003, filed on Feb. 28, 2003, which is assigned to the assignee of the present invention and is incorporated by reference herein in its entirety.

As the cooling fluid flows out of the vent tiles 116, the cooling fluid may flow into the racks 102–108. The racks 102–108 generally include inlets (not shown) on their front sides to receive the cooling fluid from the vent tiles 116. The inlets generally comprise one or more openings to enable the cooling fluid to enter the racks 102–108. In addition, or alternatively, the front sides of some or all of the racks 102–108 may comprise devices for substantially controlling the flow of cooling fluid into the racks 102–108. Examples of suitable devices are described in co-pending and commonly assigned U.S. patent application Ser. Nos. 10/425,621 and 10/425,624, both of which were filed on Apr. 30, 2003, the disclosures of which are hereby incorporated by reference in their entireties.

The cooling fluid may become heated by absorbing heat dissipated from the components 118 located in the racks 102–108 as it flows through and around the racks 102–108. The heated cooling fluid may generally exit the racks 102–108 through one or more outlets located on the rear sides of the racks 102–108. In addition, or alternatively, the rear sides of some or all of the racks 102–108 may comprise devices for substantially controlling the flow of cooling fluid into the racks 102–108 and/or controlling the flow of heated cooling fluid out of the racks 102–108. Again, examples of suitable devices are described in co-pending and commonly assigned U.S. patent application Ser. Nos. 10/425,621 and 10/425,624.

The flow of air through the racks 102–108 may substantially be balanced with the flow of air through the vent tiles 116 through operation of the above-described devices in manners consistent with those manners set forth in the above-identified co-pending applications. In addition, a proportional relationship may be effectuated between the airflow through the racks 102–108 and the vent tiles 116. Through the cooling fluid flow operations described in those co-pending applications, the level of re-circulation between the heated cooling fluid flow and the cooling fluid may substantially be reduced or eliminated in comparison with known cooling systems.

As an alternative, there may arise situations where the additional cooling fluid flow to the racks 102–108 causes the temperatures of the components to rise. This may occur, for example, when a relatively large amount of heated cooling fluid is re-circulated into the cooling fluid. In this situation, cooling fluid delivery may be reduced in response to increased component temperatures. In addition, cooling fluid delivery may be increased in response to decreased component temperatures. It should therefore be understood that the present invention is not limited to one operational manner as temperatures in the data center 100 vary.

The agents 120–124 may communicate with a robotic device 146 configured to travel to various areas and perform various functions in the data center 100. For instance, the robotic device 146 may be equipped with a sensor 148 configured to collect environmental condition information. In one regard, the robotic device 146 may include a configuration and operate in manners similar to those described in co-pending and commonly assigned U.S. patent application Ser. No. 10/446,867 filed on May 29, 2003, and entitled "DATA CENTER ROBOTIC DEVICE". The disclosure contained in that application is hereby incorporated by reference in its entirety.

The robotic device 146 is generally composed of a vehicle base 150 having a plurality of wheels to enable travel of the robotic device 146 through the data center 100. Attached to the vehicle base 150 is a rotatable arm 152 which may be articulated into various positions with respect to the vehicle base 150, for example, with six or more degrees of freedom. The sensor 148 may be attached at a free end of the arm 152 and may also be movable with respect to the arm 152, for example, with four or more degrees of freedom.

The arm 152 and the sensor 148 may thus be articulated into various positions to gather environmental condition information from areas around the robotic device 146. More particularly, the sensor 148 may be articulated into various positions such that environmental conditions may be gathered around the robotic device 146 without re-positioning the vehicle base 150. In one regard, the detection of the environmental conditions in this manner may conserve the energy stored in the robotic device 146 because it does not require that the entire robotic device 146 be maneuvered to detect environmental conditions in its vicinity.

Although the arm 152 of the robotic device 146 has been described as being movable, the arm 152 may be relatively static with respect to the vehicle base 150 without departing from the scope of the invention. In addition, the robotic device 146 may be configured without an arm or with a retractable arm.

The agents 120–124 may communicate with the robotic device 146 through a wired protocol, such as IEEE 802.3, etc., or wireless protocols, such as IEEE 801.11b, 801.11g, wireless serial connection, Bluetooth, etc., or combinations thereof. In addition, or alternatively, communications between the agents 120–124 and the robotic device 146 may be effectuated through location aware devices as described in co-pending and commonly assigned U.S. patent application Ser. No. 10/620,272.

According to an embodiment of the invention, the agents 120–124 may compare the received sensed data with predefined objectives. For instance, an objective for a rack agent 120 may be to maintain the temperature within a rack under 30° C. If the sensed data indicates that the temperature of a rack is above 30° C., the rack agent 120 assigned to that rack may transmit or otherwise send this information to the robotic device 146. The robotic device 146 may receive this information from a plurality of rack agents 120. In addition, the robotic device 146 may receive this type of information from row agents 122 and CRAC agents 124 which may also have their own predefined objectives. The predefined objectives may vary from one rack agent 120 to another rack agent 120 and may also vary between and amongst row agents 122 and CRAC agents 124. By way of example, a rack agent 120 assigned to a rack containing components that are relatively sensitive to high heat levels may have predefined objectives, e.g., operating temperature ranges, that are below rack agents 120 assigned to racks that do not contain the relatively sensitive components.

The robotic device 146 may control distribution of the cooling resources based upon the information received from the agents 120–124. In one regard, the robotic device 146 may control computing resources by varying the servers, and therefore the locations, where certain operations are performed in the data center. In varying the locations where the certain operations are performed, the robotic device 146 may have stored in its memory various levels of constraints, e.g., restrictions based upon security issues, service-level agreements, etc. Therefore, the robotic device 146 may factor in these constraints in determining manners in which the locations of the certain operations may be varied.

In addition, the robotic device 146 may control one or more rack inlet airflow controllers, e.g., the louver and/or angled panel, to vary the cooling fluid flow directed through particular racks. Moreover, the robotic device 146 may control the operations of the vent tiles 116 to control the flow of cooling fluid to various sections of the data center 100. The robotic device 146 may also control operations of CRACs 114, e.g., CRAC fan flow, cooling fluid temperature, etc., to control one or both of the cooling fluid temperature and the cooling fluid volume. The robotic device 146 may control the above-identified resources in an hierarchical manner as each resource has a corresponding energy usage requirement associated with manipulation of each resource. For instance, manipulation of computing resources requires the least amount of energy and manipulation of CRAC temperature requires the greatest amount of energy. Therefore, the robotic device 146 may decide to manipulate computing resources before manipulating CRAC temperature to thereby optimize energy usage.

Although the robotic device 146 has been described as deciding how to manipulate the above-identified resources, according to an embodiment of the invention, the agents 120–124 may also make these determinations. More particularly, the agents 120–124 may have access to information pertaining to which of these resources are to be manipulated in response to conditions received from one or more sensors. This information may also include the manners in which the resources are to be manipulated in response to the detected conditions. The information may be stored in the form of, for instance, a look-up table. The agents 120–124 may also employ equations or run other algorithms to make these determinations. In this embodiment, the agents 120–124 would not just submit a request to the robotic device 146 for changes in cooling provisions to their associated areas, but the agents 120–124 would request specific manipulations be made. The agents 120–124 may also operate within their own respective constraints, e.g., maintaining adequate cooling fluid supply to their associated areas, reliability issues, etc.

The agents 120–124 may operate in a hierarchical manner with the rack agents 120 at the lowest tier and the CRAC agents 124 at the highest tier. For instance, the rack agents 120 may be configured to control cooling fluid delivery on a more local level than the CRAC agents 124. An objective of the rack agents 120 may be to maintain the temperatures of the racks in their associated areas within predefined ranges. An objective of the row agents 122 may be to request manipulations such that the rack agents 120 achieve their goals. In addition, the CRAC agents 124 may be configured to control cooling fluid delivery and temperature on more of a global scale. Therefore, an objective of the CRAC agents 124 may be to manipulate cooling fluid volume and temperature such that the row agents 122 and rack agents 120 achieve their goals. In addition, another objective of the CRAC agents 124 may be to maintain efficient energy usage in the data center and to therefore determine operations of the CRAC 114 such that the energy usage levels are maintained while ensuring that the rack agent's 120 and row agent's 122 objectives are met. The robotic device 146 may utilize the hierarchy of the agents 120–124 in manipulating the cooling fluid flow to the various areas of the data center 100. Therefore, the robotic device 146 may give more weight to the requests made by the CRAC agent 124 because these decisions may have a larger impact on the overall operation of the data center.

The robotic device 146 may perform various control operations with respect to the cooling system, e.g., agents 120–124, vent tiles 116, CRAC 114, etc. For instance, the robotic device 146 may receive requests, e.g., bids, from the agents 120–124 for increased cooling fluid supply to various areas of the data center 100. The robotic device 146 may determine which requests are to be accepted and may vary cooling fluid delivery to various sections of the data center 100 based upon these decisions. As another example, the robotic device 146 may receive sensed data from one or more of the agents 120–124 and determine manners in which certain cooling system components should be manipulated in response to the sensed data.

As described hereinabove, the robotic device 146 may have control over a number of different devices configured to vary resources in the data center. For instance, the robotic device 146 may control where certain operations are performed, e.g., various servers at differing locations. As another example, the robotic device 146 may have control over various actuators configured to manipulate louvers, panels, vent tiles, etc. As yet another example, the robotic device 146 may have control over operations of the CRAC 114, e.g., cooling fluid volume output, cooling fluid temperature, etc.

FIG. 1C is a cross-sectional side view of an upper portion of the data center 100 according to an embodiment of the invention. According to this embodiment, the data center 100 may include a lowered ceiling 162. Dynamically controllable returns 164 and 166 may be situated along the lowered ceiling 162 to generally enable controlled removal of heated cooling fluid from the data center 100. To facilitate removal of heated cooling fluid from the data center 100, the returns 164 and 166 may include a fan 170. A more detailed description of the returns 164 and 166 and manners of their operability may be found in co-pending U.S. application Ser. No. 10/262,879, filed on Oct. 3, 2002, which is assigned to the assignee of the present invention and is hereby incorporated by reference in its entirety.

As described in the Ser. No. 10/262,879, the space 168 between the lowered ceiling 162 and the ceiling of the data center 100 may function as a plenum through which heated cooling fluid may be returned to the CRAC 114. The returns 164 and 166 may be operated by the robotic device 146 in response to receipt of sensed data from one or more of the agents 120–124. For example, the robotic device 146 may receive sensed data from a rack agent 120 and may directly or indirectly operate a return 164 or 166 to vary the removal of heated cooling fluid around an area to maintain that area within the rack agent's 120 objectives. In addition, the robotic device 146 may receive sensed data from a row agent 122 and may operate a return 164 or 166 to vary the removal of heated cooling fluid to also attempt to maintain that area within the row agent's 122 objectives.

FIG. 1D is a cross-sectional side view of an upper portion of the data center 100 according to a further embodiment of the invention. According to this embodiment, heat exchanger units ("HEU") 172 and 174 may be provided in the data center 100. The HEU's 172 and 174 are disclosed and described in co-pending U.S. application Ser. No. 10/210,040, filed on Aug. 2, 2002, which is assigned to the assignee of the present invention and is hereby incorporated by reference in its entirety. As described in the Ser. No. 10/210,040, the HEU's 172 and 174 generally operate to receive heated cooling fluid from the racks 102–108, cool the received air, and deliver the cooled air back to the racks 102–108 in a substantially controlled manner.

According to this embodiment, the robotic device 146 may operate the HEU's 172 and 174 to substantially maintain the temperatures of various areas around the data center 100 within predetermined ranges. The robotic device 146 may determine manners in which to operate the HEU's 172 and 174 based upon the sensed data received from one or more agents 120–124. In addition, the robotic device 146 may operation the HEU's 172 and 174 according to the hierarchical nature of the agents 120–124 as described hereinabove.

Figure 2:
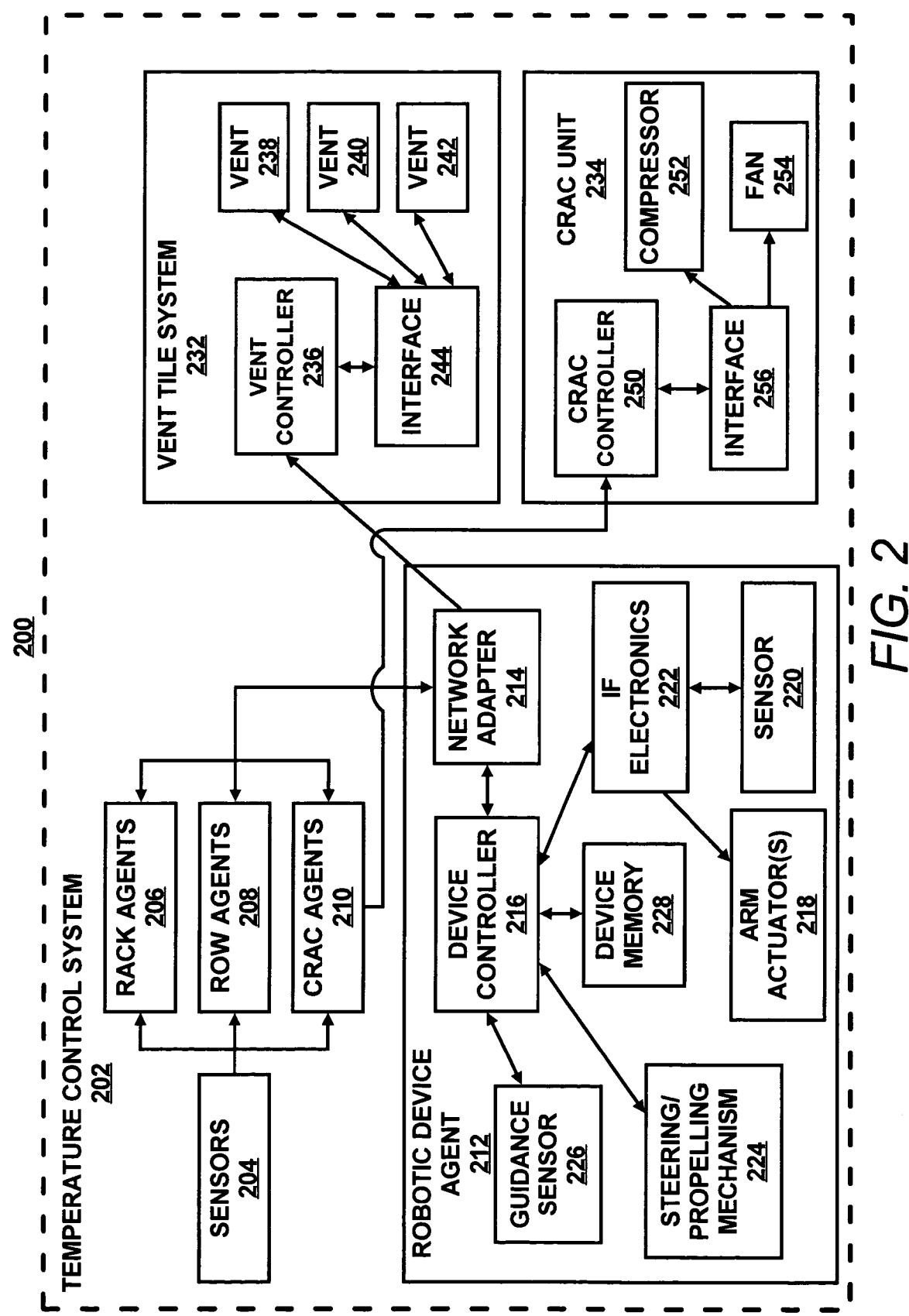
FIG. 2 is an exemplary block diagram of a temperature control system according to an embodiment of the invention.

FIG. 2 is an exemplary block diagram 200 of a temperature control system 202 according to an embodiment of the invention. It should be understood that the following description of the block diagram 200 is but one manner of a variety of different manners in which such a temperature control system 202 may be configured. In addition, it should be understood that the block diagram 200 may include additional components and that some of the components described herein may be removed and/or modified without departing from the scope of the invention. For instance, the block diagram 200 may include a rack inlet control system. The rack inlet airflow control system may include a rack louver system and/or an angled panel. The rack louver system may comprise the rack louver system described in commonly assigned and co-pending U.S. patent application Ser. No. 10/425,621, filed on Apr. 30, 2003, the disclosure of which is hereby incorporated by reference in its entirety. The angled panel may include the angled panel described in commonly assigned and co-pending U.S. patent application Ser. No. 10/425,624, filed on Apr. 30, 2003, the disclosure of which is hereby incorporated by reference in its entirety.

The control system 202 includes sensors 204 for detecting one or more environmental conditions at various locations of a room, e.g., a data center 100. The sensors 204 may be positioned to detect one or more of temperature, pressure, humidity, air flow, etc., around the racks 102–108, around the vent tiles 116, cooling fluid flowing into and out of the CRAC 114, etc. In addition, the sensors 204 may comprise sensors of the components 118 housed in the racks 102–108, e.g., sensors integrally formed with one or more of the components 118.

The sensors 204 are configured to transmit or otherwise send the sensed data to one or more agents 206–210. For instance, sensors 204 positioned to detect conditions around a rack may communicate sensed data to a rack agent 206 associated with that rack and to a row agent 208 associated with the row of racks in which that rack is situated. In addition, sensors 204 positioned to detect conditions around a CRAC may communicate sensed data to a CRAC agent 210. The agents 206–210 may compare the received sensed data with their respective predefined objectives to determine, for instance, whether the sensed data are within predetermined ranges. As stated hereinabove, the predefined objectives may vary from rack agent 206 to rack agent 206 as well as between and amongst row agents 208 and CRAC agents 210.

If the agents 206–210 determine that the detected conditions exceed their predefined objectives, the agents 206–210 may transmit or otherwise send this information to a robotic device agent 212. The robotic device agent 212 may also function as an agent with its own predefined objectives. One of the objectives may include balancing the cooling fluid provisioning with the costs associated with maintaining the various areas of the data center within predetermined ranges. Another objective may include ensuring that the components of the data center receive adequate cooling resources to operate within predetermined environmental condition ranges.

According to another embodiment, the agents 206–210 may run algorithms designed to determine manners in which one or more resources may be manipulated to enable the agents 206–210 to reach their respective objectives. The algorithms may include a reference to a look-up table, for instance, that indicates how and to what degree the one or more resources should be manipulated in response to a detected level of deviation from the agents' 206–210 objectives. The algorithms may also employ equations designed to determine how the one or more resources may be manipulated to achieve the agents' 206–210 goals. The agents 206–210 may also access computational fluid dynamics (CFD) tools to determine manners in which the one or more resources may be manipulated to achieve their goals. For instance, the agents 206–210 may run simulations on the CFD tool to determine the optimal manner in which to manipulate the one or more resources. In this embodiment, the agents 206–210 may transmit the determined manipulations to the robotic device agent 212.

In any regard, the agents 206–210 may transmit or otherwise send information to the robotic device 212 through a network adapter 214. The network adapter 214 may be configured to enable wired or wireless communication between the agents 206–210 and the robotic device agent 212. For instance, communications between the agents 206–210 and the robotic device agent 212 may be effectuated through a wired protocol, such as IEEE 802.3, etc., or wireless protocols, such as IEEE 801.11b, 801.11g, wireless serial connection, Bluetooth, etc., or combinations thereof.

The information from the agents 206–210 may be sent to a device controller 216 of the robotic device agent 212. The device controller 216 may control operations of the robotic device agent 212 and may comprise a microprocessor, a micro-controller, an application specific integrated circuit (ASIC), and the like. By way of example, the device controller 216 may control the route the robotic device 212 takes in the data center, the operations the robotic device agent 212 performs, etc. The device controller 216 may also make decisions on how cooling system components are to be operated in response to the information received from the agents 206–210.

The robotic device agent 212 may comprise the configuration of the robotic device 146 illustrated in FIG. 1B. Thus, the robotic device agent 212 may include one or more arm actuators 218 for articulating an arm assembly into various positions. The robotic device agent 212 may also include a sensor 220 configured to detect one or more environmental conditions or other instrument configured to perform other functions, e.g., a manipulator, camera, etc. Although not shown, the one or more arm actuators 218 may include actuators for articulating the sensor 220 with respect to the arm assembly. In any respect, the arm actuator(s) 218 and the actuators of the sensor 220 may comprise direct current (DC) motors.

The instructions from the device controller 216 may be sent through interface electronics 222. The interface electronics 222 may be provided to act as an interface between the device controller 216 and the arm actuator(s) 218 and the sensor 220. By way of example, the interface electronics 222 may vary the voltage supplied to the arm actuator(s) 218 to thereby articulate the sensor 220 into various positions.

The robotic device agent 212 may also include a steering/propelling mechanism 224 and a guidance sensor 226. The steering/propelling mechanism 224 is configured to control the motivation and direction of travel of the robotic device agent 212. The steering/propelling mechanism 224 may thus comprise actuators configured to vary these aspects of the robotic device agent 212 travel. The device controller 216 may also receive information from the guidance sensor 226, e.g., a laser guidance tool, sonar tool, a camera assembly, combinations thereof, and the like, configured to detect the distances of objects located within the field of view of the guidance sensor 226. The received information may be in the form of detected positions of objects located around the robotic device agent 212.

The device controller 216 may process the images received from the guidance sensor 226, e.g., with image recognition software. In this regard, the device controller 216 may determine the objects located within the guidance sensor's 226 field of view, whether the object is an avoidable obstacle, and determine a path around the obstacle if it is avoidable. The information obtained by the guidance sensor 226 may also be implemented to operate the steering/propelling mechanism 224. By way of example, the steering/propelling mechanism 224 may be caused to decrease speed and alter the course of the robotic device agent 212 in response to an object being detected in the path of the robotic device 212.

In addition, or in the alternative, the information obtained by the guidance sensor 226 may be transmitted or otherwise sent to a user who may operate the robotic device agent 212. The user may employ this information to maneuver the robotic device agent 212 around objects located in the path of the robotic device 212.

The device controller 216 may also be interfaced with a device memory 228 configured to provide storage of a computer software that provides the functionality of the robotic device agent 212. The device memory 228 may be implemented as a combination of volatile and non-volatile memory, such as DRAM, EEPROM, flash memory, and the like. The device memory 228 may also be configured to provide a storage for containing data/information pertaining to the manner in which the arm actuator(s) 218 and the sensor 220 may be operated in response to, for example, an instruction to obtain environmental condition information from various locations in the data center.

In one respect, the device memory 228 may store data/information pertaining to various operations and sensing algorithms responsive to various inputs. For example, the device memory 228 may store a map of the data center layout and the device controller 216 may access the map to determine the locations of areas where environmental conditions have been detected as being out of range. The device controller 216 may also access the map to determine a route to follow to arrive at the locations.

In addition, the device controller 216 may access the device memory 228 to determine manners in which the sensor 220 is to be operated in response to receipt of various inputs. For example, the device controller 216 may operate the sensor 220 and the arm actuator(s) 218 to obtain environmental condition information from areas, e.g., within four feet of the robotic device agent 212, surrounding the detected locations of out-of-range environmental conditions. One use of the sensor 220 is to check the sensed data detected by potentially faulty sensors. For instance, the sensor 220 may be employed to measure one or more conditions in an area associated with a sensor that indicates abnormal measurements or where there is missing environmental condition information.

Another use of the sensor 220 is to supplement the environmental condition detection of the sensors 204. For instance, because the robotic device agent 212 is able to move to various locations of the data center, the robotic device agent 212 may detect environmental conditions at locations where, for instance, there may be a gap in the coverage by the sensors 204. In addition, through use of the robotic device agent 212, the number of sensors distributed throughout the data center may be reduced by virtue of the robotic device agent's 212 ability to supplement the collection of sensed data.

The sensor 220 may transmit or otherwise send the obtained information to the device controller 216. The device controller 216 may store this information in the memory 228. For instance, the device memory 228 may store temperature measurements obtained during an environmental condition detection operation along with the locations of the detections. The device memory 228 may store this information in the form of a table, map, etc.

The device controller 216 may store the information received from the agents 206–210 in the device memory 228. In addition, the device memory 228 may store algorithms or software designed to enable the device controller 216 to make control decisions with regard to the cooling system components. For instance, the device controller 216 may employ the algorithms stored in the device memory 228 to instruct cooling system components to vary their operations based upon the information received from the agents 206–210. In addition, the algorithms stored in the device memory 228 may be implemented to control the cooling system components in manners to generally enable the robotic device agent 212 to meet its objectives.

The device controller 216 may determine manners in which the one or more resources may be manipulated in response to requests for changes received from the agents 206–210. In this regard, the device controller 216 may access an algorithm stored in the device memory 228 designed to determine manners in which one or more resources may be manipulated to enable the agents 206–210 to reach their respective objectives as well as for the robotic device 212 to meet its objectives. The algorithm may include a reference to a look-up table, for instance, that indicates how to what degree the one or more resources should be manipulated in response to a detected level of deviation from the agents' 206–210 or robotic device agent's 212 objectives. The algorithm may also employ equations designed to determine how the one or more resources may be manipulated to achieve the agents' 206–210 or the robotic device agent's 212 goals. The device controller 216 may also access computational fluid dynamics (CFD) tools to determine manners in which the one or more resources may be manipulated to achieve various goals. For instance, the device controller 216 the may run simulations on the CFD tool to determine the optimal manner in which to manipulate the one or more resources.

As shown in FIG. 2, the control system 202 also includes a a vent tile system 232 and a CRAC unit 234. The vent tile system 232 includes a vent controller 236 and plurality of vents 238–242. Although three vents 238–242 are illustrated in FIG. 2, it should be understood that any number of vents may be included in the vent tile system 232. In addition, although one vent controller 236 is illustrated, any number of vent controllers may be implemented to control any number of vents without departing from the scope of the invention. Therefore, the depiction of one vent controller 236 and three vents 238–242 is for purposes of illustration only and are not meant to limit the invention in any respect.

Although not specifically illustrated in FIG. 2, the control system 202 may also include a louver system and/or an angled panel system as described in co-pending U.S. patent applications Ser. Nos. 10/425,621 and 10/425,624. As described in those applications, cooling fluid flow through individual racks may substantially be controlled through manipulation of either the louver system or angled panel system.

The vent controller 236 is generally configured to manipulate the vents 238–242 to vary cooling fluid flow characteristics, e.g., volume flow rate, direction, etc., through the vents 238–242. In addition, the vent controller 236 may comprise a microprocessor, a micro-controller, an application specific integrated circuit (ASIC), and the like. Instructions from the vent controller 236 may be transmitted to the vents 238–242 through interface electronics 244. The interface electronics 244 may be provided to act as an interface between the vent controller 236 and the vents 238–242. By way of example, the interface electronics 244 may include a wired or wireless platform to enable the communication of instructions from the vent controller 236 to the vents 238–242. In addition, the interface electronics 244 may operate one or more actuators configured to vary the cooling fluid flow characteristics through the vents 238–242.

The CRAC unit 234 is illustrated as including a CRAC controller 250, a compressor 252 and a fan 254. The CRAC controller 250 is generally configured to control the operations of the compressor 252 and the fan 254. In addition, the CRAC controller 250 may comprise a microprocessor, a micro-controller, an application specific integrated circuit (ASIC), and the like. The compressor 252 may be operated to vary the temperature of the cooling fluid flowing through the CRAC unit 234. In addition, the fan 254 may be operated to vary the volume flow rate of the cooling fluid delivered from the CRAC. Instructions from the CRAC controller 250 may be transmitted to the compressor 252 and the fan 254 through interface electronics 256, which may act as an interface between the CRAC controller 250 and the compressor 252 and fan 254. By way of example, the interface electronics 256 may include a platform to enable communication of the instructions. In addition, for instance, the interface electronics 256 may operate to vary the supply of voltage to the compressor 252 and the fan 254 to thereby vary their operations.

Although not shown in FIG. 2, the vent tile system 212 and/or the CRAC unit 234 may each include memories accessible by the respective controllers 236, 250. The memories may store algorithms for controlling manners in which the cooling system components, e.g., vents 238–242, compressor 252, fan 254, etc., are to be operated in response to various inputs.

According to an embodiment of the invention, the temperature control system 202 may be operated in the following manner. The device controller 216 may receive information from the agents 206–210. In one respect, the information may comprise requests for additional cooling resources or for reduced cooling resources. Requests for additional cooling resources generally indicate that the temperatures in the locations associated with the requesting agents 206–210 are above predetermined ranges. Requests for reduced cooling resources generally indicate that the temperatures in the locations associated with the requesting agents 206–210 are below predetermined ranges. The robotic device 212 may determine which requests to accept and deny based upon a plurality of factors as described in greater detail hereinbelow.

In making these determinations, the robotic device agent 212 may employ a cooling resource distribution scheme based upon market-based considerations as described in commonly assigned and co-pending U.S. patent application Ser. No. 10/405,307, entitled "MARKET-BASED TEMPERATURE CONTROL SYSTEM AND METHOD" filed on Apr. 1, 2003, the disclosure of which is hereby incorporated by reference in its entirety.

As described in the Ser. No. 10/405,307, wealth may be allocated to the agents 206–210 during bidding rounds either equally or in varied amounts according to various factors, e.g., difficulty in cooling certain areas. An auctioneer compares the requests for additional cooling resources (buy bids) and requests for reduced cooling resources (sell offers) and determines which ones to accept. That is, the auctioneer determines whether changes to cooling resource provisioning are necessary and the manner in which these changes are to be effectuated. In addition, the auctioneer may control actuators designed to vary the cooling resource provisioning.

The robotic device agent 212 may be configured to receive buy bids and sell offers from the agents 206–210 as the robotic device agent 212 travels through the data center, effectively operating as an auctioneer. The robotic device agent 212, and more particularly, the device controller 216, compares the buy bids and sell offers and determines how the cooling resources should be allocated. This determination may be based upon the market based considerations described in the Ser. No. 10/405,307 application. In addition, the device controller 216 may place greater weight on the agents 206–210 closer to its location than agents located farther away. That is, in determining how to distribute cooling resources, the device controller 216 may assign greater wealth to the agents 206–210 located closer to its location. The robotic device agent 212 may also sense one or more environmental conditions at locations associated with the agents 206–210. In one regard, because the robotic device agent 212 may take measurements on its own at these locations, the robotic device agent 212 may have a better sense of the actual conditions around the agents 206–210 in the vicinity of the robotic device agent 212. This may be particularly useful, for instance, in environments where there are a relatively small number of sensors. Therefore, the robotic device agent 212 may give more weight to the requests made by agents 206–210 in the vicinity of the robotic device agent 212. In addition, the device controller 216 may store information pertaining to cooling resource allocations previously assigned to the agents 206–210 that are located farther away from its position.

The device controller 216 is configured to transmit instructions to the vent controller 236 and/or the CRAC controller 250. The device controller 216 may communicate with the vent controller 236 and the CRAC controller 250 through a wired protocol, such as IEEE 802.3, etc., or wireless protocols, such as IEEE 801.11b, 801.11g, wireless serial connection, Bluetooth, etc., or combinations thereof. The device controller 216 may be configured to substantially continuously communicate with the vent controller 236 and/or the CRAC controller 250. For instance, the network adapter 214 may comprise a wireless communication device configured to enable wireless communications between the device controller 216 and the vent controller 236 and/or the CRAC controller 250. In addition, or in the alternative, the device controller 216 may form a wired connection between itself and vent controller 236 and/or the CRAC controller 250 at various instances. For example, the robotic device 212 may be instructed to travel to the vent controller 236, form a wired connection between the device controller 216 and the vent controller 236 to enable data transfer therebetween.

By way of example, the device controller 216 may accept a request for additional cooling resources from an agent, e.g., a rack agent 206. The device controller 216 may instruct the vent controller 236 to manipulate one or more vents 238–242 to increase the cooling fluid supplied to the location associated with the rack agent 206. Conversely, if the device controller 216 accepts a request for reduced cooling resources from an agent, e.g., a row agent 208, the device controller 216 may instruct the vent controller 236 to manipulate one or more vents 238–242 to decrease cooling fluid supply to the area associated with the row agent 208. In addition, the device controller 216 may instruct the CRAC controller 250 to either increase or decrease one or more of cooling fluid temperature and flow rate in response to acceptance and denial of requests for changes in cooling fluid provisions.

Although a single robotic device agent 212 is illustrated in FIG. 2 as receiving information from the agents 206–210 and instructing the vent controller 236 and the CRAC controller 250, it should be understood that a plurality of robotic device agents 212 may operate in this manner without departing from the scope of the invention. If a plurality of robotic device agents 212 is employed, they may be configured to traverse different sections of the data center and make control decisions according to their locations. In addition, one of the plurality of robotic device agents 212 may act as a manager and may operate to make control decisions should a conflict arise, e.g., one robotic device agent 212 accepts a buy bid from an agent and another robotic device agent 212 denies the buy bid from the agent.

According to another embodiment of the invention, the device controller 216 of the robotic device 212 may perform the functions of the vent controller 236 and the CRAC controller 250. In this respect, the device controller 216 may operate the vents 238–242, the compressor 252, and the fan 254 substantially directly, i.e., without first instructing the vent controller 236 of the CRAC controller 250. In this embodiment, the vent unit tile system 232 and the CRAC unit 234 may both be configured without their respective controllers 236, 250. In this regard, the interface electronics 244, 256 may include network devices configured to enable instructions to be received directly from the device controller 216 and/or the CRAC agent 210.

Figure 3:
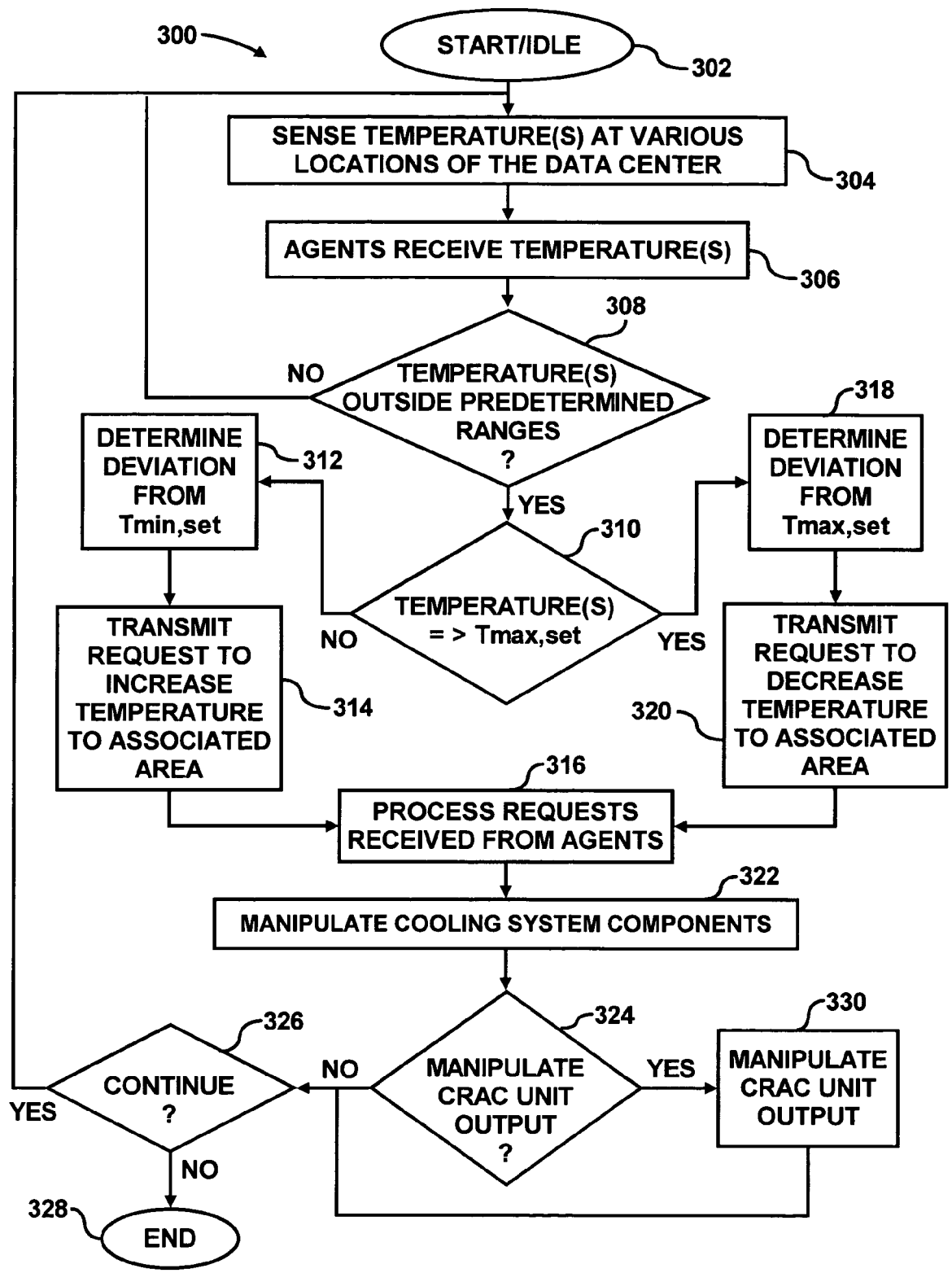
FIG. 3 illustrates an exemplary flow diagram of an operational mode of a method for operating a temperature control system according to an embodiment of the invention.

FIG. 3 illustrates an exemplary flow diagram of an operational mode 300 of a method for operating a temperature control system 202 according to an embodiment of the invention. It is to be understood that the following description of the operational mode 300 is but one manner of a variety of different manners in which an embodiment of the invention may be practiced. It should also be apparent to those of ordinary skill in the art that the operational mode 300 represents a generalized illustration and that other steps may be added or existing steps may be removed, modified or rearranged without departing from the scope of the invention.

The description of the operational mode 300 is made with reference to the block diagram 200 illustrated in FIG. 2, and thus makes reference to the elements cited therein. It should, however, be understood that the operational mode 300 is not limited to the elements set forth in the block diagram 200. Instead, it should be understood that the operational mode 300 may be practiced by a control system having a different configuration than that set forth in the block diagram 200.

The operational mode 300 may be initiated in response to a variety of stimuli at step 302. For example, the operational mode 300 may be initiated in response to a predetermined lapse of time, in response to receipt of a transmitted signal, manually initiated, etc. Once initiated, at step 304, sensors 204 may detect one or more environmental conditions, e.g., temperature, humidity, pressure, etc., at various locations of a room, e.g., a data center 100. Although in FIG. 3, the environmental condition sensed by the sensors 204 is listed as temperature, it is to be understood that the sensors 204 may detect other environmental conditions in addition to or in place of temperature without departing from the scope of the invention. Therefore, the illustration in FIG. 3 of temperature as being the sensed environmental condition is for purposes of illustration and example and not of limitation.

One or more agents 206–210, e.g., rack agents 206, row agents 208, and CRAC agents 210, may receive the detected conditions from one or more of the sensors 204 at step 306. At step 308, the agents 206–210 may determine whether the detected conditions are outside of predetermined ranges. For instance, if the detected condition is temperature, a rack agent 206 may determine whether the detected temperatures of one or more components housed in an associated rack are outside predetermined ranges. In other words, whether the detected temperatures indicate that the agent's 206–210 objectives are not being met.

The predetermined ranges may be defined, for example, as predetermined ranges of operating temperatures for the components 118, e.g., between a maximum set point temperature (Tmax,set) and a minimum set point temperature (Tmin,set). In general, the range of temperatures between Tmin,set and Tmax,set pertains to threshold temperatures that the agents 206–210 may use to determine whether cooling fluid supply to the components 118 is adequate or deficient. This range of operating temperatures may be set according to a plurality of factors. These factors may include, for example, the operating temperatures set forth by the manufacturers of the components, through testing to determine the optimal operating temperatures, etc. In addition, the predetermined range of operating temperatures may vary from one component to another.

At step 308, if the agents 206–210 determine that their objectives are being met, e.g., the temperatures of the components 118 and/or the racks 102 are within predetermined ranges, the agents 206–210 may continue to receive sensed data from the sensors 204. If the detected temperatures, for instance, are outside the predetermined ranges, the agents 206–210 may determine whether the temperatures exceed the Tmax,set. That is, the agents 206–210 may determine whether the temperatures of one or more components 118 and/or racks 102 are both outside the predetermined ranges and above the Tmax,set.

If the detected temperatures are below the Tmax,set, which indicates that the detected temperatures are below the Tmin,set since the detected temperatures have already been determined as being outside of the predetermined ranges at step 308, the agents 206–210 may determine the deviation from the Tmin,set of the detected temperatures at step 312. At step 314, the agents 206–210 may transmit a request to the robotic device agent 212 to increase temperature to their respective associated areas. The request transmitted to the robotic device agent 212 may include the deviation of the detected temperatures from the Tmin,set.

If the detected temperatures are equal to or exceed the Tmax,set, the agents 206–210 may determine the deviation from the Tmax,set of the detected temperatures at step 316. At step 318, the agents 206–210 may transmit a request to the robotic device agent 212 to decrease temperature to their respective associated areas. The request transmitted to the robotic device agent 212 may include the deviation of the detected temperatures from the Tmax,set.

According to embodiments of the invention, certain of the agents 206–210 may receive detected temperatures that are within the predetermined ranges and certain of the other agents 206–210 may receive detected temperatures that are outside of the predetermined ranges. In addition, certain of those agents 206–210 that receive detected temperatures that are outside the predetermined ranges may receive detected temperatures that are below the Tmin,set whereas others of those agents 206–210 may receive detected temperatures that are above the Tmax,set. Therefore, the requests made by individual agents 206–210 to the robotic device agent 212 may vary from one another.

At step 320, the robotic device agent 212, and more particularly, the device controller 216 may process the requests received from the agents 206–210 at steps 314 and 318. Step 320 may comprise processing the requests, for instance, to determine how the requests should be prioritized. By way of example, those agents 206–210 indicating the highest deviation from the Tmax,set or the Tmin,set may receive the highest priority. As another example, the device controller 216 may give greater weight to those agents 206–210 that are in closer proximity to the robotic device agent 212 at the time the requests are made. As yet another example, the device controller 216 may base the priority decision on the hierarchy of the agents 206–210. That is, the rack agents 206 may receive lower priority than the row agents 208 and the CRAC agents 210.

In addition, at step 320, the device controller 216 may process the requests to determine whether to accept the requests received from the agents 206–210. The decision to accept or deny the requests may be based upon a plurality of factors. For instance, the device controller 216 may decide to deny a request for an increase in temperature to an associated area of an agent 206–210 if the device controller 216 determines that such an increase may negatively impact the temperature of another area in the data center. As another example, the device controller 216 may decide to deny one or more requests if the device controller 216 determines that acceptance of the requests would lead unsatisfactory power consumption levels.

At step 320, the device controller 216 may also determine manners in which cooling system components 230 may be manipulated in response to the accepted requests. In this regard, the device controller 216 may determine which vents 238–242 to manipulate as well as the manners in which those vents 238–242 are to be manipulated in response to the accepted requests. For instance, the device controller 216 may determine that one or more of the vents 238–242 should be manipulated to increase cooling fluid flow therethrough to reduce temperature in the associated areas of requesting agents 206–210. In addition, the device controller 216 may determine that one or more of the vents 238–242 should be manipulated to decrease cooling fluid flow therethrough to reduce temperature in the associated areas of requesting agents 206–210. The device controller 216 may base the determination of whether to manipulate the vents 238–242 to either increase or decrease cooling fluid flow therethrough upon on airflow characteristics in the data center 100.

By way of example, the device controller 216 may determine how various manipulations of cooling fluid flow through the vents 238–242 generally affect the temperatures around their respective areas. For instance, the device controller 216 may cause associated vents 238–242 to increase cooling fluid flow therethrough in response to all accepted requests from agents 206–210. The device controller 216 may then determine whether these vent 238–242 manipulations achieved the desired result of reducing temperatures in associated areas of the requesting agents 206–210. This determination may be made through sensing the temperatures of the areas associated with the vents 238–242 that have been manipulated to decrease the temperatures in their associated areas.

If the desired results are not achieved, the device controller 216 may control one or more of the vents 238–242 to decrease the cooling fluid flow therethrough in response to a request from one or more of the agents 206–210 to decrease the temperatures in their respective areas. This may result in the desired temperature reduction, for instance, because increasing cooling fluid flow to a particular region in the data center 100 may actually have the opposite effect of increasing the temperature in that region. One reason for this situation is that at times, due to the circulation characteristics in the data center 100, cooling fluid from the CRAC unit 234 circulates and mixes freely with heated air from the components 118 and the racks 102 and the temperature of the cooling fluid associated with a supplying vent may actually be higher than its temperature when exiting the vent.

Again, it may be determined whether the desired results have been obtained through sensing of the associated areas of the manipulated vents 238–242. In either event, the device controller 216 may store information pertaining to the manner in which the vents 238–242 were manipulated to achieve the desired results in the device memory 228. In addition, the device controller 216 may continue to manipulate the vents 238–242 in this manner in response to requests from agents 206–210 until a change is detected, i.e., it is determined that the vent 238–242 manipulations do not result in the intended results. A more detail description of this embodiment is set forth in co-pending and commonly assigned U.S. patent application Ser. No. 10/446,854, the disclosure of which is hereby incorporated by reference in its entirety.

According to an embodiment of the invention, a computational fluid dynamics (CFD) tool designed to calculate airflow dynamics at various locations of the data center 100 based upon inputted temperatures and airflow characteristics in the data center 100 may be implemented to determine manners in which the vents 238–242 may be manipulated in response to the requests received from the agents 206–210. The CFD tool may be programmed, for example, to generate a thermal map of the data center 100 including the airflow characteristics. The thermal map may be accessed by the device controller 216 to determine, for instance, how various vent 238 manipulations may affect temperatures in the various areas of the data center 100. The device controller 216 may employ this software to predict how changes to cooling fluid supply to the data center 100 will affect the temperature levels of various areas in the data center 100. In addition, the device controller 216 may substantially base its determinations of vent 238–242 manipulations upon the outcomes predicted through use of the CFD tool.

At step 322, the robotic device agent 212 may communicate with the vent controller 236 to manipulate one or more of the vents 238–242 in accordance with its determination at step 320. For instance, for those components 118 and/or racks 102 having temperatures below the Tmin,set, the device controller 216 may instruct the vent controller 236 to decrease the cooling fluid flow to those components 118 and/or racks 102. In addition, for those components 118 and/or racks 102 having temperatures above or equal to the Tmax,set, the device controller 216 may instruct the vent controller 236 to increase the cooling fluid flow to those components 118 and/or racks 102. The instructions to either increase or decrease cooling fluid flow sent from the device controller 216 to the vent controller 236 may also include the level to which the vent controller 236 is to vary the cooling fluid delivery to the components 118 and/or racks 102. The vent controller 236 may also access a memory (not shown) indicating which vents 238–242 to manipulate in response to the instructions received from the device controller 216.

If the device controller 216 is configured to communicate directly with the vents 238–242, the device controller 216 may determine which of the vents 238–242 are to be manipulated as well as the levels to which they are to be manipulated. In addition, the device controller 216 may control the manipulations of the selected vents 238–242 through the direct communication with the vents 238–242.

At step 324, the device controller 216 may determine whether to manipulate the CRAC unit 234. This determination may be made based upon, for example, changes to cooling fluid flow delivery to the components 118 and/or racks 102. For instance, if there is relatively significant change in the cooling requirements of a relatively large portion of components 118 and/or racks 102, the device controller 216 may determine that the CRAC unit 234 requires adjustment.

If the device controller 216 determines that the CRAC unit 234 does not require an output change, it may be determined whether the operational mode 300 is to be continued at step 326. The operational mode 300 may be continued for an indefinite period of time, e.g., so long as data center 100 is operational, for a predetermined period of time, between predetermined time periods, etc. If it is determined that the operational mode 300 is to continue, steps 304–320 may be repeated. On the other hand, if it is determined that the operational mode 300 is to be discontinued, e.g., time period expires, the data center 100 powers down, etc., the operational mode 300 may end as indicated at step 328. Step 328 may be similar to an idle mode for the operational mode 300 since the operational mode 300 may be reactivated, for instance, when the data center 100 becomes activated, in response to manual input to reactivate the operational mode 300, etc.

If the device controller 216 determines that the CRAC unit 234 requires an output change, the device controller 216 may communicate an instruction to the CRAC agent 210, which can communicate to and control the CRAC unit 234, to adjust one or both of the temperature of the cooling fluid and the volume flow rate of the cooling fluid delivered from the CRAC unit 234, at step 330. In one regard, because the CRAC agent 210 may be aware of certain constraints in the operations of the CRAC unit 234, the CRAC agent 210 may be better equipped to make certain CRAC unit 234 control decisions. For instance, therefore, if the instructions from the device controller 216 do not violate any of the constraints on the CRAC unit 234 operations, the CRAC agent 210 may proceed to control the CRAC unit 234 in the manner instructed by the device controller 216. On the other hand, should the instructions violate a constraint on the CRAC unit 234 operations, the CRAC agent 210 may modify the instructions and control the CRAC unit 234 in manners that comply with the constraints.

If the device controller 216 determines that a decrease in CRAC unit 234 output is required, the device controller 216 may instruct the CRAC agent 210 to decrease one or both of cooling fluid temperature and volume flow rate. If the device controller 216 determines that an increase in CRAC unit 234 output is required, the device controller 216 may instruct the CRAC agent 210 to increase one or both of cooling fluid temperature and volume flow rate. The instructions to either vary the CRAC unit 234 output sent from the device controller 216 to the CRAC agent 210 may also include the level to which the CRAC controller 250 is to vary the CRAC unit 234 output. The CRAC agent 210 may also access a memory (not shown) storing algorithms pertaining to manners in which to manipulate the compressor 252 and/or the fan 254 in response to the instructions received from the device controller 216.

Although not specifically illustrated in FIG. 3, the decision to vary the output of a plurality of CRAC units 234 may be relatively independent for each of the CRAC units 234. For instance, in a relatively large data center having a plurality of CRAC units 234, the decision to vary the outputs of one or more of the CRAC units 234 may be made substantially independently for each of the CRAC units 234. Thus, a CRAC unit 234 supplying cooling fluid to one section of the data center may vary its output to decrease cooling fluid volume flow rate whereas a different CRAC unit 234 supplying cooling fluid to another section of the data center may vary its output to increase the cooling fluid temperature.

If the device controller 216 is configured to communicate directly with the compressor 252 and the fan 254, the device controller 216 may determine which of the compressor 252 and the fan 254 is to be manipulated as well as the levels to which they are to be manipulated. In addition, the device controller 216 may control the manipulations of the compressor 252 and/or the fan 254.

Following step 330, it may be determined whether the operational mode 300 is to be continued as indicated hereinabove at step 326.

According to another embodiment of the invention, at step 314, the agents 206–210 may transmit a request to the robotic device agent 212 to manipulate one or more cooling system components, e.g., vent tiles, rack louvers, etc., to increase temperature to their respective associated areas. In addition, at step 318, the agents 206–210 may transmit a request to the robotic device agent 212 to manipulate one or more cooling system components to decrease temperature to their respective associated areas. In this embodiment, the agents 206–210 are aware of the various cooling system component manipulations capable of achieving their desired results. For instance, the agents 206–210 may access a look up table (LUT) that includes manipulations for various detected conditions.

At step 320, the robotic device agent 212 may process the requests to manipulate one or more cooling system components received from the agents 206–210. The request processing may include, for instance, determining how the requests should be prioritized. By way of example, those agents 206–210 indicating the highest deviation from the Tmax,set or the Tmin,set may receive the highest priority. As another example, the device controller 216 may give greater weight to those agents 206–210 that are in closer proximity to the robotic device agent 212 at the time the requests are made. As yet another example, the device controller 216 may base the priority decision on the hierarchy of the agents 206–210. That is, the rack agents 206 may receive lower priority than the row agents 208 and the CRAC agents 210.

The device controller 216 may also determine whether to accept or deny the requests. The decision to accept or deny the requests may be based upon a plurality of factors. For instance, the device controller 216 may decide to deny a request for an increase in temperature to an associated area of an agent 206–210 if the device controller 216 determines that such an increase may negatively impact the temperature of another area in the data center. As another example, the device controller 216 may decide to deny one or more requests if the device controller 216 determines that acceptance of the requests would lead unsatisfactory power consumption levels.

At step 322, the device controller 216 may communicate to the agents 206–210 whether or not their request has been accepted. If their request has been accepted, the device controller 216 may manipulate the requested cooling system components in the manners set forth in the requests received at steps 314 and 318.

At step 324, the device controller 216 whether to accept a request received from a CRAC agent 210 to manipulate components of a CRAC unit 234, e.g., compressor 252, fan 254, etc. Again, the device controller 216 may base the determination of whether to accept or deny the request based upon a plurality of factors. For instance, the decision may be based upon whether there is a relatively significant change in the cooling requirements of a relatively large portion of components 118 and/or racks 102. As another example, the device controller 216 may decide to deny a request from a CRAC agent 210 if accepting the requested manipulation would lead to undesirable power consumption levels.

If the device controller 216 determines that the CRAC unit 234 does not require an output change or if the device controller 216 denies the CRAC agent's 210 request, it may be determined whether the operational mode 300 is to be continued at step 326. The operational mode 300 may be continued for an indefinite period of time, e.g., so long as data center 100 is operational, for a predetermined period of time, between predetermined time periods, etc. If it is determined that the operational mode 300 is to continue, steps 304–320 may be repeated. On the other hand, if it is determined that the operational mode 300 is to be discontinued, e.g., time period expires, the data center 100 powers down, etc., the operational mode 300 may end as indicated at step 328. Step 328 may be similar to an idle mode for the operational mode 300 since the operational mode 300 may be reactivated, for instance, when the data center 100 becomes activated, in response to manual input to reactivate the operational mode 300, etc.

If the device controller 216 accepts the CRAC agent's 210 request, the device controller 216 may communicate an instruction to the CRAC agent 210 to adjust one or both of the temperature of the cooling fluid and the volume flow rate of the cooling fluid delivered from the CRAC unit 234, at step 330. If the device controller 216 determines that a decrease in CRAC unit 234 output is required, the device controller 216 may instruct the CRAC agent 210 to decrease one or both of cooling fluid temperature and volume flow rate. If the device controller 216 determines that an increase in CRAC unit 234 output is required, the device controller 216 may instruct the CRAC agent 210 to increase one or both of cooling fluid temperature and volume flow rate. The instructions to either vary the CRAC unit 234 output sent from the device controller 216 to the CRAC agent 210 may also include the level to which the CRAC agent 210 is to vary the CRAC unit 234 output. The CRAC agent 210 may also access a memory (not shown) storing algorithms pertaining to manners in which to manipulate the compressor 252 and/or the fan 254 in response to the instructions received from the device controller 216. Alternatively, the device controller 216 may communicate directly with the CRAC controller 250 to manipulate the CRAC unit 234 components in a desired manner.

Following step 330, it may be determined whether the operational mode 300 is to be continued as indicated hereinabove at step 326.

Figure 4:
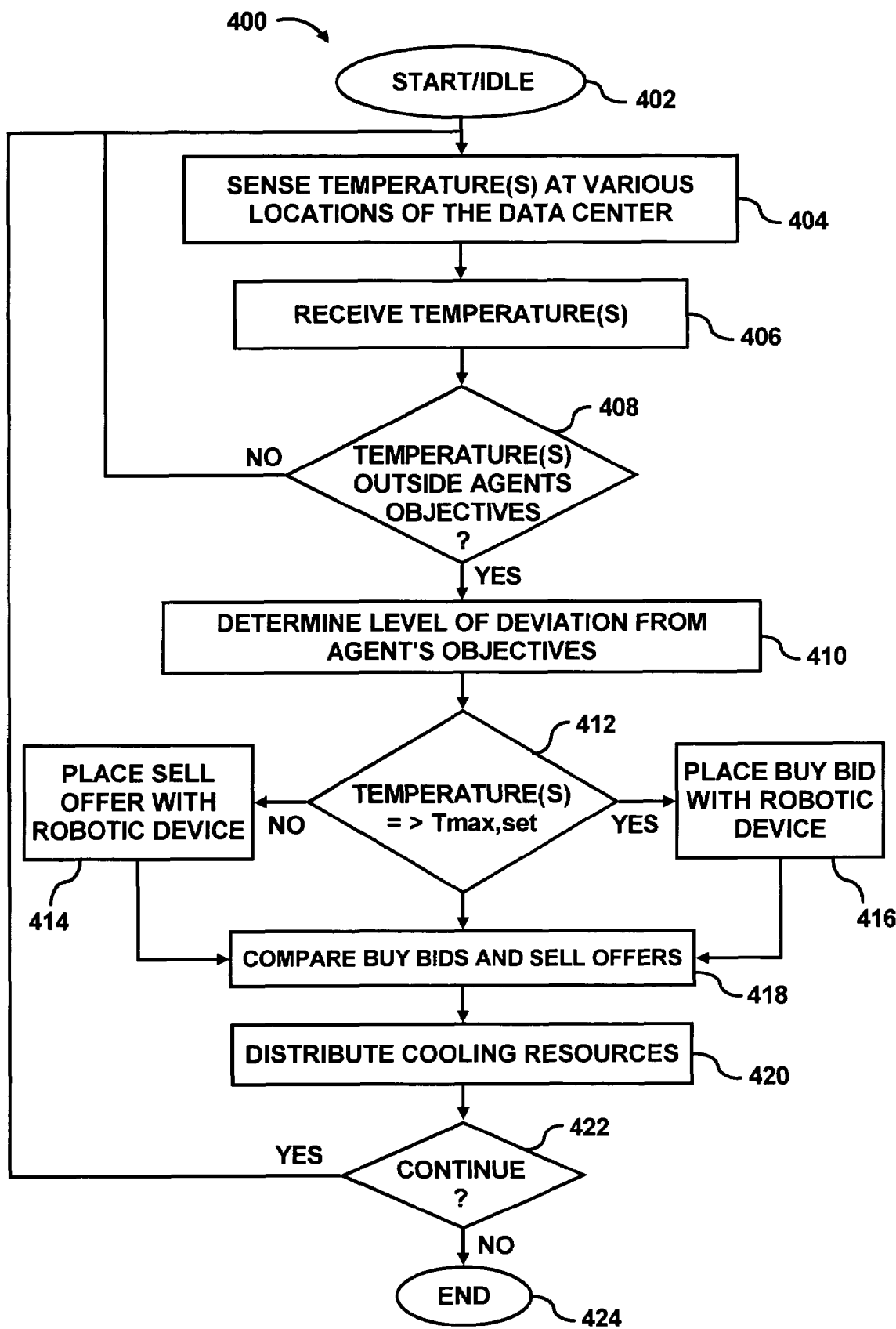
FIG. 4 illustrates an exemplary flow diagram of an operational mode of a method for operating a temperature control system according to another embodiment of the invention.

FIG. 4 illustrates an exemplary flow diagram of an operational mode 400 of a method for operating a temperature control system 202 according to another embodiment of the invention. It is to be understood that the following description of the operational mode 400 is but one manner of a variety of different manners in which an embodiment of the invention may be practiced. It should also be apparent to those of ordinary skill in the art that the operational mode 400 represents a generalized illustration and that other steps may be added or existing steps may be removed, modified or rearranged without departing from the scope of the invention.

The description of the operational mode 400 is made with reference to the block diagram 200 illustrated in FIG. 2, and thus makes reference to the elements cited therein. It should, however, be understood that the operational mode 400 is not limited to the elements set forth in the block diagram 200. Instead, it should be understood that the operational mode 400 may be practiced by a control system having a different configuration than that set forth in the block diagram 200.

The operational mode 400 may be initiated in response to a variety of stimuli at step 402. For example, the operational mode 400 may be initiated in response to a predetermined lapse of time, in response to receipt of a transmitted signal, manually initiated, etc. The initiation of the operational mode 400 may constitute a bidding round in which the agents 206–210 bid for or offer to sell cooling resources. The bidding rounds may initiated at predetermined time intervals, based upon the location of the robotic device agent 212, at the request of the robotic device agent 212 or one or more of the agents 206–210, in response to environmental condition changes, etc.

Once initiated, at step 404, sensors 204 may detect one or more environmental conditions, e.g., temperature, humidity, pressure, etc., at various locations of a room, e.g., a data center 100. One or more agents 206–210, e.g., rack agents 206, row agents 208, and CRAC agents 210, may receive the detected conditions from one or more of the sensors 204 at step 406. At step 408, the agents 206–210 may determine whether the detected conditions are outside of their respective objectives. The objectives of the agents 206–210 may differ from one agent to another, including between rack agents 206, row agents 208, and CRAC agents 210. If the detected condition is temperature, for instance, the objectives of the agents 206–210 may be to maintain their associated areas within predetermined temperatures.

If the objectives of the agents 206–210 are met, e.g., the detected temperatures are within predetermined temperature ranges, steps 404–408 may be repeated. If one or more of the agents' 206–210 objectives are not met, e.g., the detected temperatures are outside of the predetermined temperature ranges, those agents 206–210 whose objectives are not met may determine the level of deviation of the detected conditions from those agents' 206–210 objectives at step 410. The determination of the level of deviation from the agents' 206–210 objectives may include a determination of whether the detected conditions fall below or exceed the predetermined ranges as described hereinabove, at step 412.

If the detected conditions fall below those agents' 206–210 objectives, i.e., the detected conditions fall below predetermined ranges, those agents 206–210 may place a sell offer to the robotic device 212 at step 414. In other words, those agents 206–210 may offer to sell cooling resources because the areas associated with those agents 206–210 do not require the level of cooling resources they have currently been allocated.

If the detected conditions exceed those agents' 206–210 objectives, i.e., the detected conditions exceed the Tmax,set, those agents 206–210 may place a buy bid for additional cooling resources to the robotic device agent 212 at step 416. That is, those agents 206–210 associated with areas having detected conditions that exceed the predetermined ranges may request additional cooling resources in an effort to reduce, for instance, the temperatures in their associated areas.

At step 418, the robotic device agent 212, and more particularly the device controller 216, may compare the buy bids and sell offers received from the one or more agents 206–210. In comparing the buy bids and sell offers, the device controller 216 may determine which buy bids to accept and which ones to reject. In addition, the device controller 216 may determine which sell offers to accept and which ones to reject. The decision to accept and/or reject buy bids and sell offers may be based upon a plurality of factors. For instance, these decisions may be based upon the robotic device agent's 212 objectives. That is, for example, the robotic device 212 may have an objective to maintain the costs associated with cooling the components 118 in the data center 100 within predetermined limits. In attempting to reach this objective, the device controller 216 may determine that certain buy bids are unacceptable and therefore that it may be tolerable if some of the agents' 206–210 objectives are not met.

The device controller's 216 decisions may be based upon the hierarchy of the bidding agents 206–210. For instance, bids and offers placed by CRAC agents 210 may receive greater weight than bids and offers placed by either row agents 208 or rack agents 206. In addition, bids and offers placed by row agents 208 may be given greater weight than bids and offers placed by rack agents 206. In addition, certain agents 206–210 in the same tier may receive greater weight than other agents in the same tier. For instance, the device controller 216 may base its decisions on the market-based approach described hereinabove and in co-pending U.S. patent application Ser. No. 10/405,307. More particularly, the agents 206–210 may be assigned various wealth statuses and the device controller 216 may determine which buy bids to accept according to the wealth of the agent(s) 206–210 submitting the buy bids. As described in the Ser. No. 10/405,307, greater wealth may be afforded those agents 206–210 associated with areas that are known to be relatively more difficult to cool, e.g., racks located near the ends of the rows of racks where heated cooling fluid is relatively more likely to recirculate with chilled cooling fluid.

As another example, the device controller 216 may base its decisions on the buy bid amounts. That is, for instance, the buy bid may be higher for those detected conditions that have a higher level of deviation from the predetermined ranges. Thus, those agents 206–210 submitting relatively higher buy bids are in greater need for cooling resources than those agents 206–210 with lower buy bids. In addition, those components 118 associated with those agents 206–210 may be nearing unsafe operating conditions. Consequently, the device controller 216 may decide to accept the highest bids and deny the lowest bids.

With respect to the sell offers, the device controller 216 may decide to accept some or all of the sell offers. Although it may seem to be beneficial in terms of operating costs to accept all of the sell offers, this may not always be true due to the airflow circulation characteristics of data centers as described hereinabove. Therefore, the device controller 216 may decide to reject certain sell offers if, for instance, reducing cooling fluid flow to the areas associated with the offering agents 206–210 would have an effect opposite the desired goal of reducing cooling fluid usage in those areas, e.g., decreases the temperatures around those areas.

As a further example, the device controller 216 may give greater weight to those agents 206–210 submitting buy bids and sell offers located in closer proximity to the robotic device agent 212 at the time the bids and offers are placed. In one regard, the device controller 216 may afford greater weight to the agents 206–210 located closer to its location because it is less cognizant of demands made by agents 206–210 located farther away. However, the device controller 216 may store information pertaining to promised cooling provisions to those agents 206–210 located farther away and its decisions may be based upon these promised resources.

Once the device controller 216 has decided which buy bids and sell offers to accept and decided how to distribute cooling resources at step 418, the device controller 216 may instruct either or both of the vent controller 236 and the CRAC agent 210 to vary cooling fluid characteristics at step 420. The distribution of cooling resources may be effectuated as described hereinabove with respect to FIG. 3. More particularly, the device controller 216 may instruct the vent controller 236 to vary cooling fluid delivery to the areas associated with the agents 206–210 whose buy bids and sell offers have been accepted (step 322). Furthermore, the device controller 216 may instruct the CRAC agent 210 to vary one or both of cooling fluid temperature and volume for those areas associated with the agents 206–210 whose buy bids and sell offers have been accepted (step 330).

At step 422, it may be determined whether the operational mode 400 is to be continued. The operational mode 400 may be continued for an indefinite period of time, e.g., so long as data center 100 is operational, for a predetermined period of time, between predetermined time periods, etc. If it is determined that the operational mode 400 is to continue, steps 404–420 may be repeated. On the other hand, if it is determined that the operational mode 400 is to be discontinued, e.g., the data center 100 is powered down, the operational mode 400 is manually ceased, etc., the operational mode 400 may end as indicated at step 424. Step 424 may be similar to an idle mode for the operational mode 400 since the operational mode 400 may be reactivated, for instance, when one or more of the components 118 in the data center 100 become activated.

The operations set forth in the operational modes 300 and 400 of FIGS. 3 and 4 may be contained as utilities, programs, or subprograms, in any desired computer accessible medium. In addition, the operational modes 300 and 400 may be embodied by computer programs, which can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
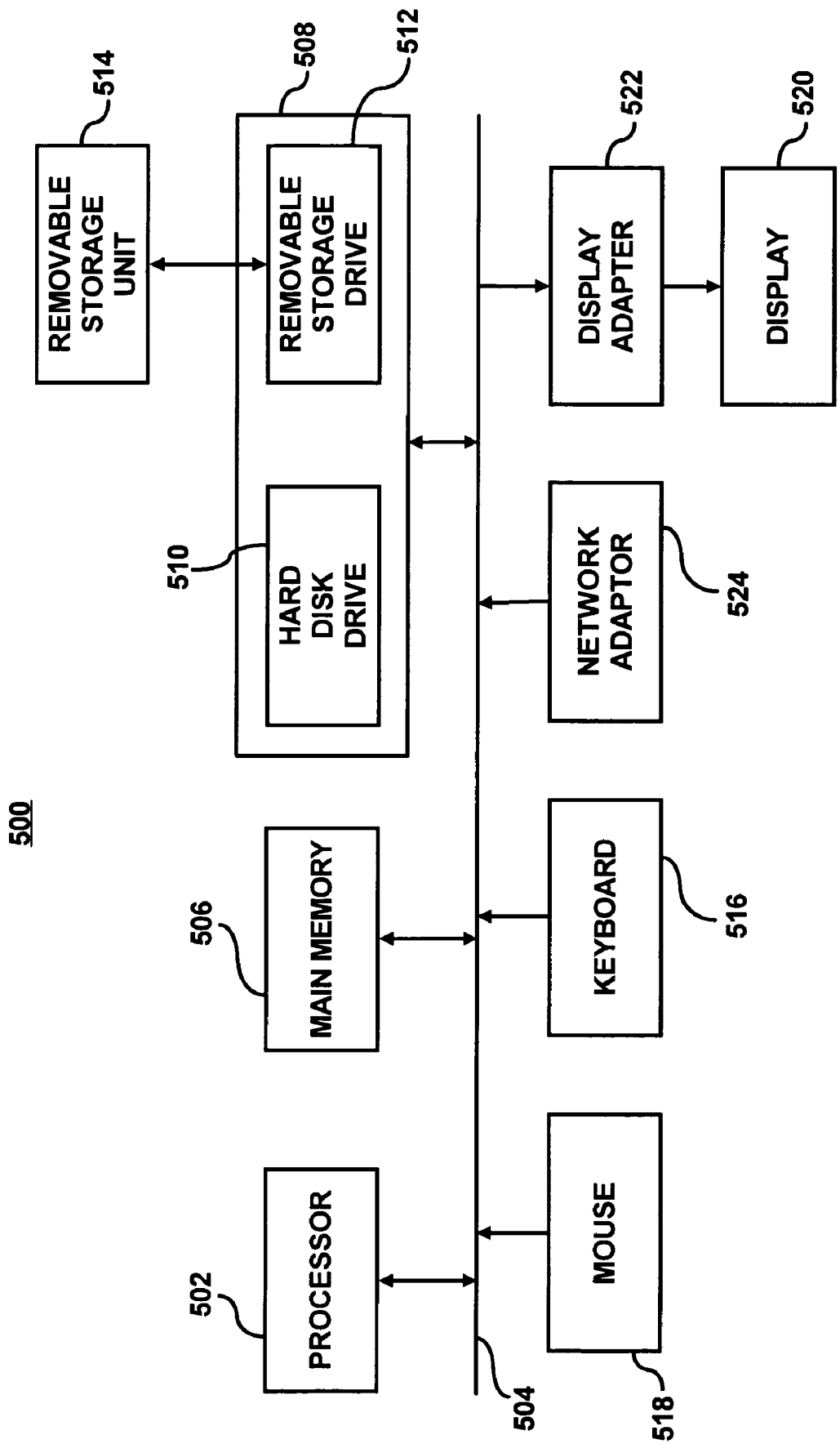
FIG. 5 illustrates an exemplary computer system 500, according to an embodiment of the invention.

FIG. 5 illustrates an exemplary computer system 500, according to an embodiment of the invention. The computer system 500 may include, for example, the device controller 216. In this respect, the computer system 500 may be used as a platform for executing one or more of the functions described hereinabove with respect to the device controller 216.

The computer system 500 includes one or more controllers, such as a processor 502. The processor 502 may be used to execute some or all of the steps described in the operational modes 300 and 400. Commands and data from the processor 502 are communicated over a communication bus 504. The computer system 500 also includes a main memory 506, e.g., memory 228, such as a random access memory (RAM), where the program code for the robotic device 212 may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the provisioning system may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, e.g., the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (e.g., user input devices, secondary memory, etc.).

Through implementation of the robotic device as described hereinabove, distributed agents may be employed to direct provisioning of cooling resources to, for instance, reduce power consumption and to increase cooling efficiency. In addition, the distributed agents may better monitor conditions in the data center by processing information in parallel at different locations in the data center. Individual thresholds and routines may be associated with the distributed agents to enable limited autonomy when controlling operations of the cooling system. The distributed agents may also be configured to request assistance from the robotic device to meet their predefined goals. In another respect, a robotic device is configured to traverse the data center and to make cooling resource control decisions based upon information received from the agents and the robotic device's objectives.

The robotic device may operate to obtain sensed data with its own sensor. Therefore, in a data center having a relatively small number of sensors, for instance, the robotic device may operate to supplement the data collection performed by these sensors. More particularly, the robotic device may be capable of obtaining data at locations that are outside of the sensors' ranges. In addition, because the sensed data obtained by the sensors in this type of configuration may be less reliable than the sensed data obtained by the robotic device, the robotic device may afford greater weight to those requests made by agents in its vicinity. Consequently, the decisions made by the robotic device in varying cooling resource provisioning may be based upon relatively accurate information.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for agent-based operation of a robotic device, said method comprising:

detecting at least one condition in various locations of a room with a plurality of sensors;

in a plurality of agents associated with respective areas of the room, the plurality of agents being configured to control at least one condition in the respective associated areas, receiving sensed data from at least one of the plurality of sensors, determining whether the received sensed data are outside of respective predetermined ranges, and transmitting information to the robotic device related to the sensed data in response to the sensed data being outside of the predetermined ranges;

in the robotic device, processing the information received from one or more of the plurality of agents to determine whether components of a cooling system are to be manipulated to vary a characteristic of cooling fluid supplied to the various locations of the room.

2. The method according to claim 1, further comprising:
in the plurality of agents, determining a deviation of the sensed data from the respective predetermined ranges; and
wherein the step of transmitting information to the robotic device comprises transmitting information pertaining to the deviation of the sensed data from the respective predetermined ranges.

3. The method according to claim 2, further comprising:
in the robotic device, processing the information pertaining to the deviation of the sensed data from the respective predetermined ranges and increasing cooling fluid flow to the associated areas of the one or more agents that transmitted information indicating that the deviation of the sensed data from the respective predetermined ranges exceeds the respective predetermined ranges.

4. The method according to claim 2, further comprising:
in the robotic device, processing the information pertaining to the deviation of the sensed data from the respective predetermined ranges and decreasing cooling fluid flow to the associated areas of the one or more agents that transmitted information indicating that the deviation of the sensed data from the respective predetermined ranges falls below the respective predetermined ranges.

5. The method according to claim 2, further comprising:
in the robotic device, processing the information pertaining to the deviation of the sensed data from the respective predetermined ranges and decreasing cooling fluid flow to the associated areas of the one or more agents that transmitted information indicating that the deviation of the sensed data from the respective predetermined ranges exceeds the respective predetermined ranges.

6. The method according to claim 2, further comprising:
in the robotic device, processing the information pertaining to the deviation of the sensed data from the respective predetermined ranges and increasing cooling fluid flow to the associated areas of the one or more agents that transmitted information indicating that the deviation of the sensed data from the respective predetermined ranges falls below the respective predetermined ranges.

7. The method according to claim 1, further comprising:
in the robotic device, detecting at least one condition; and
wherein the step of processing the information received from one or more of the plurality of agents to determine whether components of a cooling system are to be manipulated further comprises processing the detected at least one condition to determine whether components of a cooling system are to be manipulated to vary a characteristic of cooling fluid supplied to the various locations of the room.

8. The method according to claim 1, further comprising:
in the plurality of agents, determining which cooling system components to manipulate and a manner in which to manipulate the determined cooling system components, wherein the step of transmitting information to the robotic device comprises transmitting information pertaining to which cooling system components to manipulate and a manner in which to manipulate the determined cooling system components;
in the robotic device, processing the information received from the plurality of agents and determining which of the requested manipulations to accept.

9. The method according to claim 1, further comprising:
in the robotic device, transmitting control signals to one or more cooling system components to vary cooling fluid delivery to areas of the room associated with the one or more agents that indicated that the sensed data are outside of the predetermined ranges.

10. The method according to claim 1, wherein the step of processing the information received from one or more of the plurality of agents to determine whether components of a cooling system are to be manipulated to vary a characteristic of cooling fluid supplied to the various locations of the room further comprises determining whether an output of an air conditioning unit of the cooling system is to be manipulated; and
transmitting control signals to the air conditioning unit to vary at least one of cooling fluid temperature and output in response to a determination to manipulate the air conditioning unit.

11. The method according to claim 1, further comprising:
in the plurality of agents, determining a deviation of the sensed data from the respective predetermined ranges; and
wherein the step of transmitting information to the robotic device comprises transmitting at least one of a buy bid and a sell offer for cooling resources in response to the determined deviation of the sensed data from the respective predetermined ranges, wherein the step of transmitting a buy bid comprises transmitting a buy bid in response to the determined deviation of the sensed data exceeding the respective predetermined ranges and wherein the step of transmitting a sell offer comprises transmitting a sell offer in response to the determined deviation of the sensed data falling below the respective predetermined ranges.

12. The method according to claim 11, wherein the step of transmitting at least one of a buy bid and a sell offer for cooling resources comprises pricing the at least one of a buy bid and a sell offer according to the deviation of the sensed data from the respective predetermined ranges.

13. The method according to claim 12, further comprising:
in the robotic device, comparing the at least one of a buy bid and a sell offer transmitted from the plurality of agents to determine which of the buy bids and sell offers to accept.

14. The method according to claim 13, wherein the step of comparing the at least one of a buy bid and a sell offer comprises giving greater weight to those buy bids and sell offers transmitted from the plurality of agents located in greater proximity to the robotic device at the time the at least one of a buy bid and a sell offer was transmitted to the robotic device.

15. The method according to claim 13, wherein the plurality of agents are classified in an hierarchical manner; and
wherein the step of comparing the at least one of a buy bid and a sell offer comprises giving greater weight to those buy bids and sell offers transmitted from those agents having a higher classification in the hierarchy of agents.

16. The method according to claim 13, wherein the step of comparing the at least one of a buy bid and a sell offer comprises determining which of a plurality of buy bids to accept and which of a plurality of sell offers to accept according to market-based considerations.

17. The method according to claim 16, wherein the step of determining which of a plurality of buy bids to accept and which of a plurality of sell offers to accept according to market-based considerations comprises basing a decision to accept one or more of the plurality of buy bids on respective prices of the plurality of buy bids and basing a decision to accept one or more of the plurality of sell offers on respective prices of the plurality of sell offers.

18. The method according to claim 13, wherein the step of comparing the at least one of a buy bid and a sell offer comprises determining which of a plurality of buy bids to accept and which of a plurality of sell offers to accept according to predefined objectives of the robotic device.

19. The method according to claim 18, wherein the predefined objectives of the robotic device comprises maintaining the costs associated with maintaining locations of the room within predefined amounts.

20. The method according to claim 13, further comprising:
controlling one or more cooling system components to manipulate cooling fluid delivery to areas associated with agents whose buy bids or sell offers have been accepted by the robotic device.

21. The method according to claim 1, further comprising:
in the robotic device, determining whether to manipulate one or more cooling resources comprising of computing resource, a rack inlet airflow controller, a vent tile, a CRAC fan flow, and a CRAC temperature in response to the information received from the agents.

22. The method according to claim 21, wherein the robotic device is configured to manipulate the one or more cooling resources according to the hierarchy of the cooling resource, said hierarchy being based on the energy cost associated with the respective cooling resource.

23. The method according to claim 1, further comprising:
in the plurality of agents, determining whether to manipulate one or more of computing resource, a rack inlet airflow controller, a vent tile, a CRAC fan flow, and a CRAC temperature in response to the sensed data received from the sensors.

24. The method according to claim 23, wherein the robotic device is configured to manipulate the one or more cooling resources according to the hierarchy of the cooling resource, said hierarchy being based on the energy cost associated with the respective cooling resource.

25. A system for agent-based operation of a robotic device, said system comprising:
a plurality of sensors for detecting at least one condition at various locations of a room;
one or more agents associated with respective areas of the room, said one or more agents configured to control at least one condition in the respective associated areas, said one or more agents being further configured to receive sensed data from at least one of the plurality of sensors, the one or more agents being configured to determine whether the received sensed data are outside of respective predetermined ranges;
a robotic device configured to maneuver around the room and to communicate with the one or more agents;
a cooling system having a plurality of cooling system components configured to vary at least one characteristic of cooling fluid delivery to the various locations of the room; and
wherein the robotic device is configured to manipulate at least one of the plurality of cooling system components in response to a communication from the one or more agents that at least one detected condition is outside predetermined ranges.

26. The system according to claim 25, wherein the one or more agents are classified in an hierarchical manner, and wherein those of the one or more agents having lower classifications are configured to control at least one condition in smaller areas of the room than those of the one or more agents having the higher classifications.

27. The system according to claim 25, wherein the one or more agents are configured to determine which cooling system components to manipulate and a manner in which to manipulate the determined cooling system components, said one or more agents being further configured to transmit the determined cooling system components to manipulate and the manner in which to manipulate the determined cooling system components to the robotic device.

28. The system according to claim 25, wherein the one or more agents are configured to determine a deviation of the received sensed data from the respective predetermined ranges and to communicate the deviation of the received sensed data to the robotic device to thereby request modifications in cooling resource distribution.

29. The system according to claim 28, wherein the robotic device is configured to compare the requests for modifications in cooling resource distribution communicated from the one or more agents to determine which of the requests to accept and deny, and wherein the robotic device is further configured to manipulate the cooling resource distribution in response to the accepted requests.

30. The system according to claim 29, wherein the robotic device is configured to determine which of the requests to accept and deny according to market-based considerations.

31. The system according to claim 30, wherein the robotic device is configured to allocate wealth to the one or more agents and associate prices for requests for modifications in cooling resource distribution submitted by the one or more agents.

32. The system according to claim 29, wherein the robotic device is configured to determine which of the request to accept and deny according to predefined objectives of the robotic device.

33. The system according to claim 28, wherein the robotic device comprises a sensor configured to detect at least one condition, said robotic device being configured to employ the sensed data obtained from the sensor in determining which of the requests from the one or more agents to accept or deny.

34. The system according to claim 25, wherein the robotic device is configured to perform a numerical modeling of airflow characteristics in the room to determine manners of manipulating the at least one of the plurality of cooling system components.

35. The system according to claim 25, wherein the plurality of cooling system components includes one or more of cooling resource distribution, rack inlet airflow controllers, vent tiles, CRAC fan, and CRAC airflow temperature controller.

36. A system for agent-based operation of a robotic device means, said system comprising:
means for detecting at least one condition in various locations of a room;
agent means for controlling at least one condition in the various locations of the room, said means for controlling having means for receiving sensed data from the means for detecting, said agent means for controlling further having means for determining whether the received sensed data are outside of respective predetermined ranges, and means for transmitting information to the robotic device means related to the sensed data in response to the sensed data being outside of the predetermined ranges;

in the robotic device means, means for processing the information received from the means for controlling to determine whether components of a cooling system are to be manipulated to vary a characteristic of cooling fluid supplied to the various locations of the room.

37. The system according to claim 36, wherein the agent means for controlling includes means for determining a deviation of the sensed data from the respective predetermined ranges; and wherein the means for transmitting information to the robotic device means comprises means for transmitting information pertaining to the deviation of the sensed data from the respective predetermined ranges.

38. The system according to claim 37, wherein the robotic device means includes means for processing the information pertaining to the deviation of the sensed data from the respective predetermined ranges and means for varying cooling fluid flow to the associated areas of the agent means for controlling that transmitted information indicating that the deviation of the sensed data from the respective predetermined ranges are outside of the respective predetermined ranges.

39. The system according to claim 36, wherein the robotic device means includes means for transmitting control signals to one or more cooling system components to vary cooling fluid delivery to areas of the room associated with the agent means for controlling that indicated that the sensed data are outside of the predetermined ranges.

40. The system according to claim 36, wherein the agent means for controller includes means for determining a deviation of the sensed data from the respective predetermined ranges; and means for transmitting at least one of a buy bid and a sell offer for cooling resources in response to the determined deviation of the sensed data from the respective predetermined ranges, wherein the means for transmitting a buy bid comprises means for transmitting a buy bid in response to the determined deviation of the sensed data exceeding the respective predetermined ranges and means for transmitting a sell offer comprises means for transmitting a sell offer in response to the determined deviation of the sensed data falling below the respective predetermined ranges.

41. The system according to claim 40, wherein the robotic device means includes means for allocating wealth to the agent means for controlling and wherein the agent means for controlling includes means for pricing the at least one of a buy bid and a sell offer according to the deviation of the sensed data from the respective predetermined ranges and wealth allocated to the agent means for controlling.

42. The system according to claim 41, wherein the robotic device means comprises means for comparing the at least one of a buy bid and a sell offer transmitted from the agent means for controlling to determine which of the buy bids and sell offers to accept.

43. A computer readable storage medium on which is embedded one or more computer programs, said one or more computer programs implementing a method for agent-based operation of a robotic device, said one or more computer programs comprising a set of instructions for:

detecting at least one condition in various locations of a room with a plurality of sensors;

in a plurality of agents associated with respective areas of the room, the plurality of agents being configured to control at least one condition in the respective associated areas, receiving sensed data from at least one of the plurality of sensors, determining whether the received sensed data are outside of respective predetermined ranges, and transmitting information to the robotic device related to the sensed data in response to the sensed data being outside of the predetermined ranges;

in the robotic device, processing the information received from one or more of the plurality of agents to determine whether components of a cooling system are to be manipulated to vary a characteristic of cooling fluid supplied to the various locations of the room.

44. The computer readable storage medium according to claim 43, said one or more computer programs further comprising a set of instructions for:

in the plurality of agents, determining a deviation of the sensed data from the respective predetermined ranges; and transmitting information pertaining to the deviation of the sensed data from the respective predetermined ranges to the robotic device.

45. The computer readable storage medium according to claim 43, said one or more computer programs further comprising a set of instructions for:

in the robotic device, processing the information pertaining to the deviation of the sensed data from the respective predetermined ranges and varying cooling fluid flow to the associated areas of the one or more agents that transmitted information indicating that the deviation of the sensed data from the respective predetermined ranges are outside of the respective predetermined ranges.

46. The computer readable storage medium according to claim 43, said one or more computer programs further comprising a set of instructions for:

in the robotic device, detecting at least one condition; and wherein the step of processing the information received from one or more of the plurality of agents to determine whether components of a cooling system are to be manipulated further comprises processing the detected at least one condition to determine whether components of a cooling system are to be manipulated to vary a characteristic of cooling fluid supplied to the various locations of the room.

47. The computer readable storage medium according to claim 43, said one or more computer programs further comprising a set of instructions for:

in the plurality of agents, determining which cooling system components to manipulate and a manner in which to manipulate the determined cooling system components, wherein the step of transmitting information to the robotic device comprises transmitting information pertaining to which cooling system components to manipulate and a manner in which to manipulate the determined cooling system components;

in the robotic device, processing the information received from the plurality of agents and determining which of the requested manipulations to accept.

48. The computer readable storage medium according to claim 43, said one or more computer programs further comprising a set of instructions for:

in the one or more agents, determining a deviation of the sensed data from the respective predetermined ranges; and transmitting at least one of a buy bid and a sell offer for cooling resources in response to the determined deviation of the sensed data from the respective predetermined ranges, wherein the step of transmitting a buy bid comprises transmitting a buy bid in response to the determined deviation of the sensed data exceeding the respective predetermined ranges and wherein the step of transmitting a sell offer comprises transmitting a sell offer in response to the determined deviation of the sensed data falling below the respective predetermined ranges.

49. The computer readable storage medium according to claim 48, said one or more computer programs further comprising a set of instructions for:

in the robotic device, allocating wealth to the one or more agents; and in the one or more agents, pricing the at least one of a buy bid and a sell offer according to the deviation of the sensed data from the respective predetermined ranges and wealth allocated to the one or more agents.

50. The computer readable storage medium according to claim 49, said one or more computer programs further comprising a set of instructions for:

controlling one or more cooling system components to manipulate cooling fluid delivery to areas associated with agents whose buy bids or sell offers have been accepted by the robotic device.

* * * * *